(12) United States Patent
Itani et al.

(10) Patent No.: US 8,111,977 B2
(45) Date of Patent: Feb. 7, 2012

(54) PLAYBACK DEVICE AND METHOD

(75) Inventors: Tetsuya Itani, Nara (JP); Osamu Hosoi, Osaka (JP)

(73) Assignee: Panasonic Corporation, Osaka (JP)

( * ) Notice: Subject to any disclaimer, the term of this patent is extended or adjusted under 35 U.S.C. 154(b) by 620 days.

(21) Appl. No.: 12/356,760

(22) Filed: Jan. 21, 2009

(65) Prior Publication Data

US 2009/0185795 A1 Jul. 23, 2009

(30) Foreign Application Priority Data

Jan. 22, 2008 (JP) ................................ 2008-011251

(51) Int. Cl.
*H04N 5/93* (2006.01)
*H04N 5/765* (2006.01)
(52) U.S. Cl. ........................................ 386/353; 386/232
(58) Field of Classification Search .................. 386/353, 386/232, 230, 263, 233
See application file for complete search history.

(56) References Cited

U.S. PATENT DOCUMENTS

| 2003/0210338 A1* | 11/2003 | Matsuoka et al. ........ 348/231.99 |
| 2005/0134735 A1* | 6/2005 | Swartz .......................... 348/554 |
| 2006/0171665 A1 | 8/2006 | Itani |
| 2007/0248324 A1 | 10/2007 | Itani |
| 2008/0018787 A1* | 1/2008 | Hopper et al. ................ 348/448 |

FOREIGN PATENT DOCUMENTS

| JP | 2001-117539 | 4/2001 |
| JP | 2006-222938 | 8/2006 |
| JP | 2007-312376 | 11/2007 |

OTHER PUBLICATIONS

Hi-Vi Magazine, Sep. 2007, Stereo Sound Publishing, Inc., pp. 121 and 123.

* cited by examiner

*Primary Examiner* — Robert Chevalier
(74) *Attorney, Agent, or Firm* — Wenderoth, Lind & Ponack, L.L.P.

(57) ABSTRACT

To provide a playback device 200 that outputs video to a display device by converting an output frame rate of source video signals in accordance with a display capability of the display device, the source video signals having 60 Hz frame rate in a first period and 24 Hz frame rate in a second period.

12 Claims, 19 Drawing Sheets

PLAYBACK DEVICE AND METHOD

BACKGROUND OF THE INVENTION (1) Field of the Invention

The present invention belongs to the technical field of video output technology.

(2) Related Art

A video output technology concerns playing back video signals recorded on recording media or transmitted via a transmission line, and outputting video signals that conform to the scanning system designated by the mode set in playback devices.

Conventionally, these video signals had been output at 60 fps (or 60/1.001 fps) so as to enable playback on a television receiver. However, following the popularization of monitors, projectors, computer monitors, and the like that are compatible with 24 fps (or 24/1.001 fps) capable of using frame rate for movies without conversion, the new trend in recent years has been to output video signals for movies at 24 fps frame rate.

The output frame rate of video signals in a playback device depends on the status settings of the device. The status setting are set to default values when the device is shipped by manufactures, with users being able to freely change these settings via a graphic user interface (GUI) menu or the like.

For example, according to an art disclosed in the Patent Document 1, a BD player outputs video by switching a frame rate of video signals between 60 fps and 24 fps depending on an original frame rate of the video signals to be played back, only after a user has intentionally set the operation mode of the playback device to the discontinuous mode that permits switching of frame rate during playback.

Suppose a case where a playback device is connected with a display device via a connection such as the High Definition Multimedia Interface (HDMI) standards in which data is transmitted between these devices in synchronization with each other. If a frame rate is switched during playback, re-synchronization between the playback device and the display device needs to be performed. Output of video will be suspended during the re-synchronization. However, according to the playback device disclosed in the Patent Document 1, the user is only permitted to select the discontinuous mode after being informed of the possibility of interrupted playback during output of mixed signals of 60 Hz and 24 Hz signals. Accordingly, product complaints are unlikely to arise even if re-synchronization causes image disruption during playback.

Patent Document 1: Japanese Laid-Open Patent Application Publication No. 2006-222938 (FIG. 1)

Non-Patent Document 1: Hi-Vi Magazine, September 2007 Issue, pp. 118-123 (Stereo Sound Publishing, Inc.)

By the way, the BD-ROM standards stipulate that a fixed frame rate of video data constituting one playlist should be used. Accordingly, even if the discontinuous mode has been set in the BD player disclosed in the Patent Document 1, re-synchronization due to switching of the frame rate does not cause intermittent images during playback of one playlist of the main feature.

Compared with this, since the DVD-Video standards do not stipulate that a fixed frame rate of video data constituting one playlist should be used, one playlist might include both 24 Hz signals and 60 Hz signals. In particular, there has recently been a demand for improving image quality of DVD-Videos by recording video signals at 24 fps that is the same as the frame rate of movie materials, without conversion. This results in a high possibility of supply of the main feature composed of one playlist in which signals have different frame rates.

If the art disclosed in the Patent Document 1 is applied to a DVD player in such a situation, a frame rate of video signals is likely to be frequently switched even during playback of one playlist constituting the main feature. As a result, occurrence of intermittent images might dramatically increase. Since understanding of such a case is difficult for beginner users having less technical knowledge, it is concerned that new type product complaints might arise.

SUMMARY OF THE INVENTION

The present invention aims to provide a playback device and a playback method that are capable of outputting video at a plurality of frame rates and avoiding occurrence of product complaints due to intermittency of video signals during playback.

In order to achieve the above aim, the playback device relating to the present invention provides a playback device that performs video output to a display device by converting an output frame rate of source video signals in accordance with an operation mode of the playback device, the source video signals having a first period in which a frame rate is a first frame rate and a second period in which the frame rate is a second frame rate, the playback device comprising: a mode setup unit operable to, in accordance with a user selection, set the operation mode to one of a fixed mode in which the output frame rate is fixed to the first frame rate and a switchable mode in which the output frame rate is switchable between the first frame rate and the second frame rate; a switch unit operable to switch a video output mode between (a) a first output mode in which the source video signals are output in the first period without converting the output frame rate, and are output in the second period by converting the output frame rate to the first frame rate and (b) a second output mode in which the source video signals are output in the second period without converting the output frame rate, and are output in the first period by converting the output frame rate to the second frame rate; and a switch reception unit operable to, while the source video signals are output to the display device in the switchable mode, receive a user instruction to switch the output frame rate from one of the first frame rate and the second frame rate to the other, wherein if the switch reception unit receives the instruction to switch the output frame rate to the second frame rate, the switch unit switches the video output mode to the second output mode, and if the switch reception unit receives the instruction to switch the output frame rate to the first frame rate, the switch unit switches the video output mode to the first output mode. With this structure, the playback device relating to the present invention is capable of outputting video at both the first frame rate and the second frame rate, and the output frame rate used in the playback device is selectively fixed to either the first frame rate or the second frame rate. Accordingly, even if a frame rate of a source signal is converted during playback of video, images being played back in the display device are not suddenly interrupted. Also, the playback device is not permitted to output video at the second frame rate unless the user intentionally instructs to output the video at the second frame rate. Furthermore, it is possible to easily switch again the output frame rate from the second frame rate to the first frame rate during playback. Therefore, even if the image quality deteriorates as a result of conversion of the first frame rate of a video signal to the second frame rate for output, product complaints are unlikely to arise.

Accordingly, the capabilities of the playback device and the display device can be readily exhibited in the case where the playback device is disposed in an environment in which playback at the second frame rate is realized.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF PREFERRED EMBODIMENTS

The following describes preferred embodiments of the present invention with reference to the drawings.

(First Embodiment)

Figure 1:
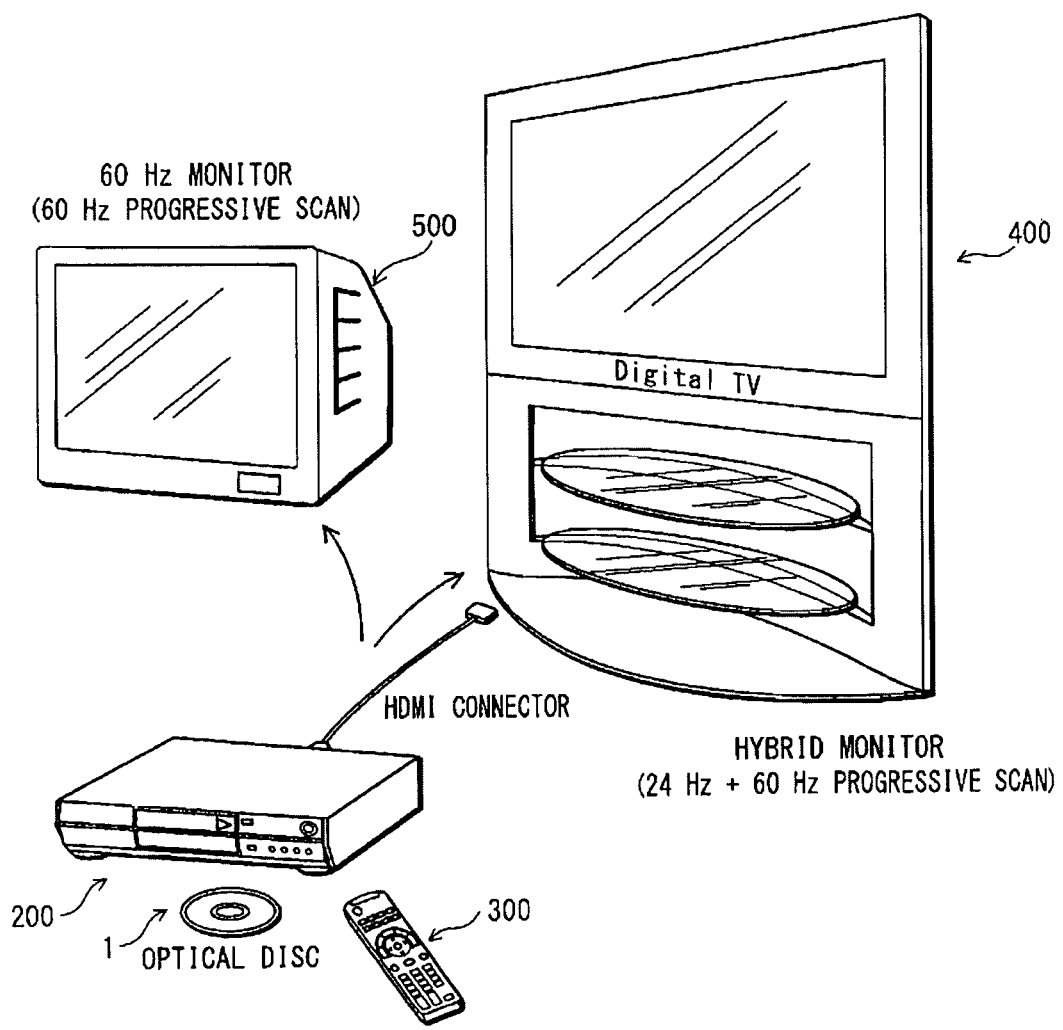
FIG. 1 shows a form of using a playback device relating to the present invention.

Firstly, among various forms of practicing a playback device relating to the present invention, a form of using the playback device is described. FIG. 1 shows a form of using the playback device relating to the present invention. In FIG. 1, a playback device 200 is the playback device relating to the present invention, and is used for a home theater system composed of a remote controller 300, a hybrid monitor 400, and a 60 Hz monitor 500.

The playback device 200 plays back video signals recorded on an optical disc 1. The playback device outputs 60 fps progressive video signals (herein after, "60 Hz progressive video signals") and 24 fps progressive video signals (herein after, "24 Hz progressive video signals"). The playback device 200 includes a digital output terminal, and transmits these video signals to the hybrid monitor 400 and the 60 Hz monitor 500 via an HDMI connector.

The optical disc 1 may be a BD-ROM disc, a DVD-Video disc, or the like on which video works such as movies are recorded. The first embodiment describes a case where the optical disc 1 is a DVD-Video disc that exhibits an excellent playback effect under the playback control that is a characteristic feature of the present invention.

The hybrid monitor 400 is capable of displaying both 60 Hz and 24 Hz progressive video signals.

The 60 Hz monitor 500 is capable of displaying 60 Hz progressive video signals.

This completes the description of the use of the playback device relating to the present invention.

Next, a form of producing the playback device relating to the present invention is described. It is possible to industrially manufacture playback devices relating to the present invention based on the internal structure thereof shown in FIG. 2.

Figure 2:
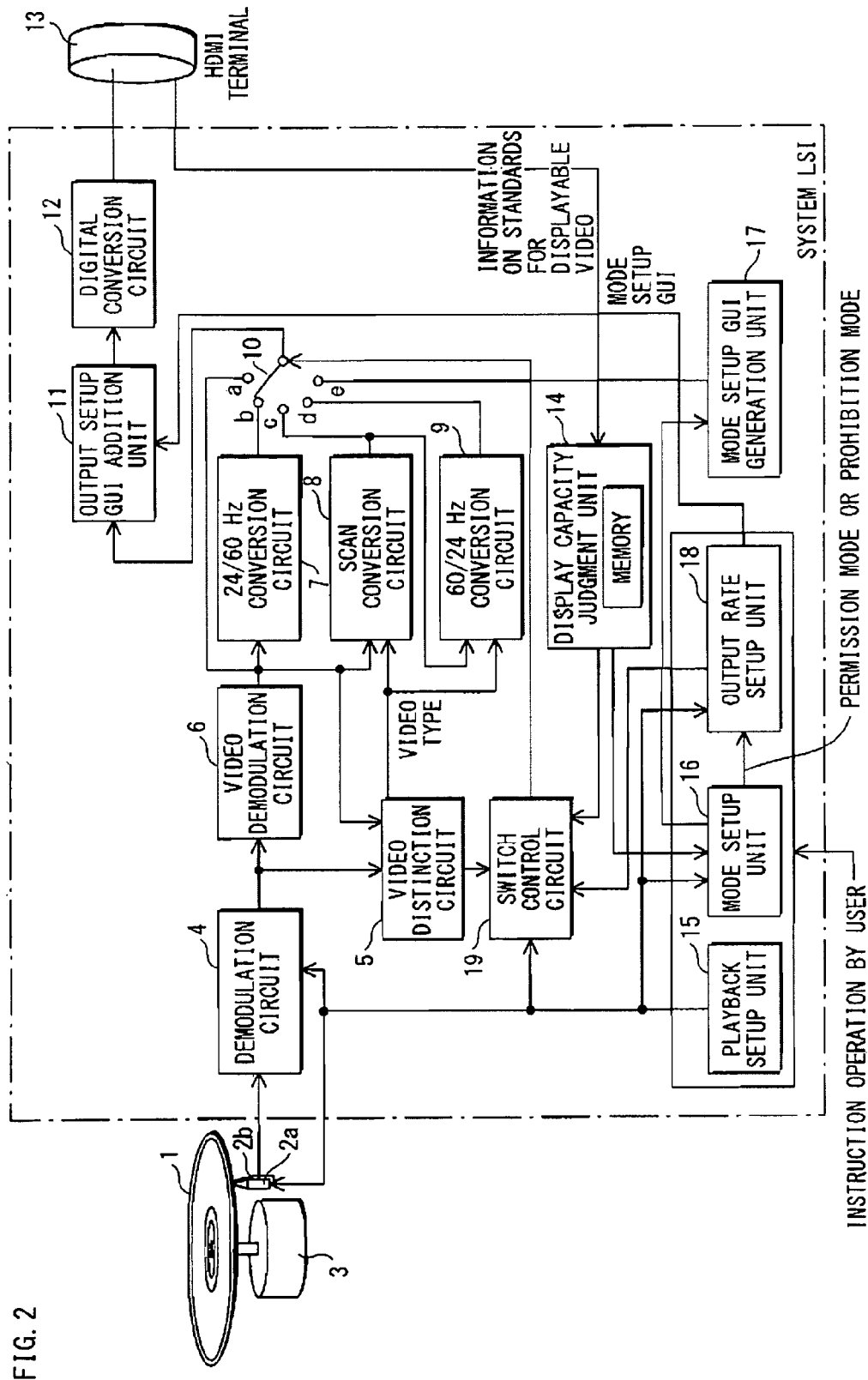
FIG. 2 is a block diagram showing a playback device according to a first embodiment of the present invention.

FIG. 2 is a block diagram showing a playback device according to the first embodiment. As shown in FIG. 2, the playback device includes an optical pickup 2, a motor 3, a demodulation circuit 4, a video distinction circuit 5, a video demodulation circuit 6, a 24/60 Hz conversion circuit 7, a scan conversion circuit 8, a 60/24 Hz conversion circuit 9, a switch 10, an output setup GUI addition unit 11, a digital conversion circuit 12, an HDMI terminal 13, a display capacity judgment unit 14, a playback setup unit 15, a mode setup unit 16, a mode setup GUI generation unit 17, an output rate setup unit 18, and a switch control circuit 19. These constituent elements from the demodulation circuit 4 to the switch control circuit 19 excepting the HDMI terminal 13 are integrated as a single system LSI.

<Optical Disc 1>

The optical disc 1 is a DVD-video disc having MPEG-2 (ITU-T Rec. H.262/ISO/IEC 13818-2) compressed video signals recorded thereon.

Figure 3:
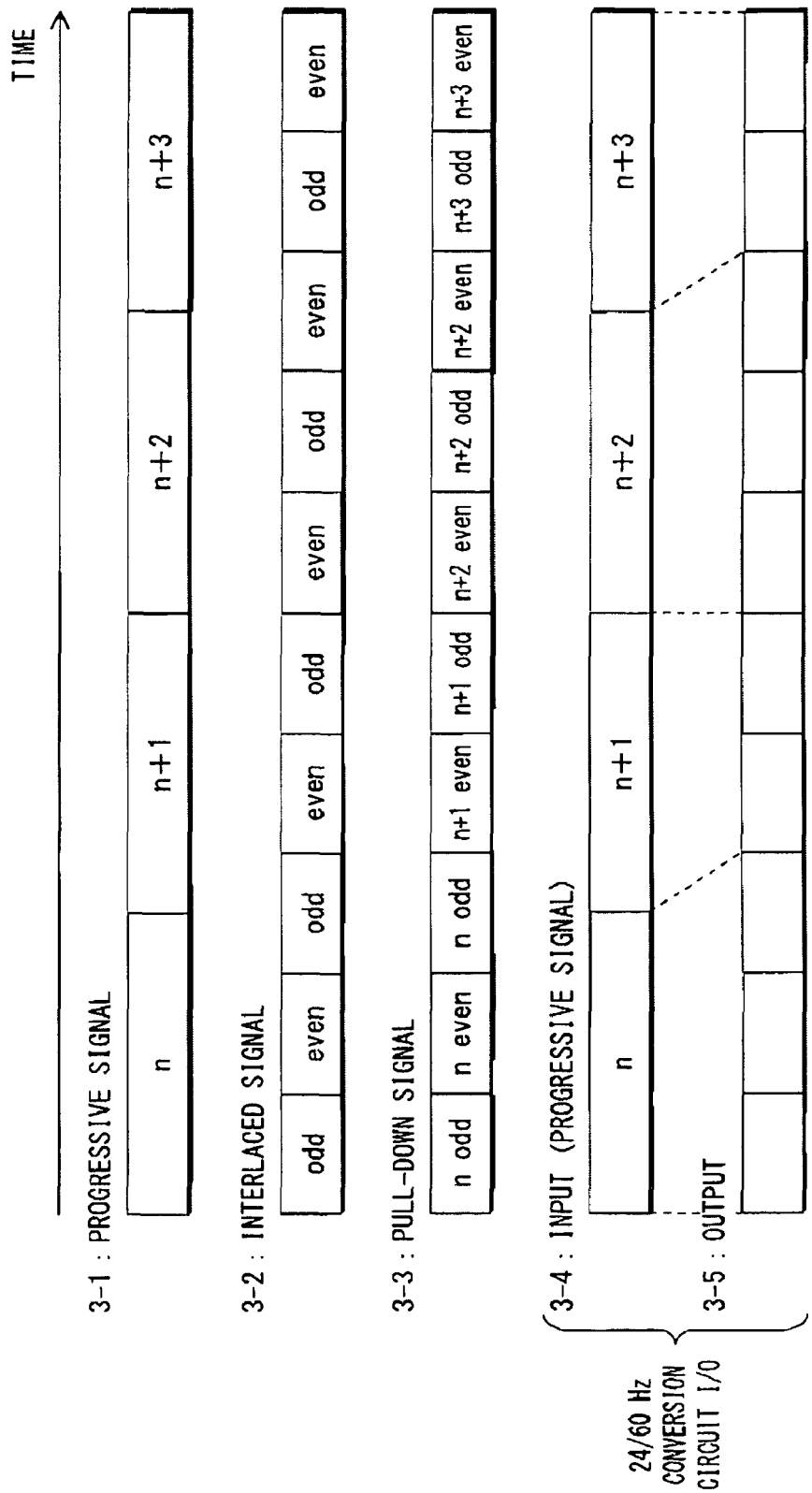
FIG. 3 shows three types of video signals recorded on an optical disc 1 and the input/output to/from a 24/60 Hz conversion circuit 7.

The video signals recorded on the optical disc 1 include three types of video signals, specifically, progressive video signals, interlaced video signals, and pull-down video signals. FIG. 3 shows these three types of video signals recorded on the optical disc 1.

Progressive video signals have film-captured video signals as their signal source, and are composed of 24 fps frames n, n+1, n+2, and n+3, as shown at a level 3-1 in FIG. 3.

Interlaced video signals have video signals generally captured by video camera as their signal source, and are composed of odd and even fields alternately appearing at 30 fps (60 field/sec) intervals, as shown at a level 3-2 in FIG. 3.

Pull-down video signals are video signals obtained by performing 3:2 pull-down to convert each frame constituting 24 fps video into alternately two and three fields. As shown at a level 3-3 in FIG. 3, a pull-down video signal is composed of fields appearing at 30 fps (60 field/sec) intervals in the following manner: n odd, n even, n odd, n+1 even, n+1 odd, n+2 even, n+2 odd, n+2 even, n+3 odd, and n+3 even.

Flags showing whether the compressed video signals are progressively scanned or interlaced scanned are also recorded on the optical disc 1. Such flags are superimposed on the frames or fields constituting each video signal, and show the signal to be either progressively scanned or interlaced scanned. Therefore, by referring to the superimposed flags for each frame or field, the playback device is able to find out the signal type of a video signal, even if the signal has been changed to a different type of signal during playback of a single AV file.

Figure 4:
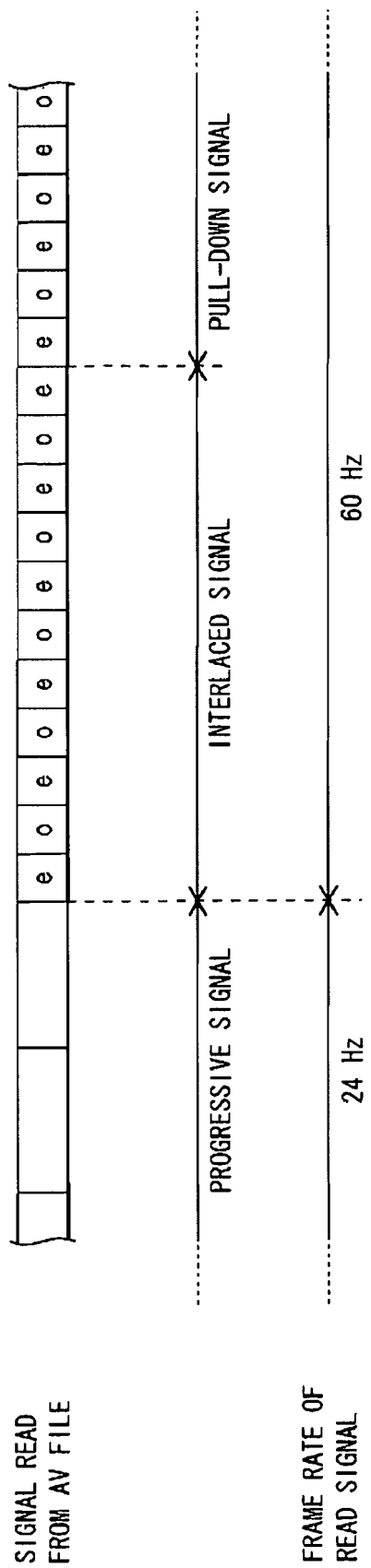
FIG. 4 shows signals that include signals having 24 Hz frame rate and signals having 60 Hz frame rate, which is obtained by reading a single AV file.

Actual movies include, besides the main feature, other items such as outtakes, interviews, and making of videos. Each of these items mostly consists of a different type of video signals among progressive, interlaced, and pull-down video signals. Furthermore, for convenience of edition, a single AV file constituting the main feature is often composed of a mixture of progressive, interlaced, and pull-down video signals. If such an AV file is played back, which is the main feature containing a mixture of progressive, interlaced, and pull-down video signals, signals obtained by reading the AV file have a period in which 24 Hz frame rate is used for output and a period in which 60 Hz frame rate is used for output, as shown in FIG. 4. This completes description of the optical disc 1.

<Optical Pickup 2, Motor 3, and Demodulation Circuit 4>

The optical pickup 2 includes a DVD pickup 2a and a BD pickup 2b, and converts signals recorded on the optical disc 1 into electrical signals. The playback setup unit 15 is notified of which pickup has been used for reading the signals.

The motor 3 rotates the optical disc 1 at a suitable playback speed.

The demodulation circuit 4 demodulates electrical signals resulting from the conversion by the optical pickup 2 to obtain a bit string. The demodulation circuit 4 performs error correction and the like on the bit string, and outputs compressed video signals and supplementary information necessary for playback.

<Video Distinction Circuit 5>

The video distinction circuit 5 determines, based on the output from the demodulation circuit 4 and the video demodulation circuit 6, whether a video signal played back from the optical disc 1 is a progressive video signal, an interlaced video signal, or a pull-down video signal, with reference to values indicated by the above flag superimposed for each frame or field. Then, the video distinction circuit 5 notifies the scan conversion circuit 8, the 60/24 Hz conversion circuit 9, and the switch control circuit 19 of a result of the determination.

Specifically, the video distinction circuit 5 reads a flag showing whether the video signal superimposed on the output from the demodulation circuit 4 is progressively scanned or interlaced scanned. If the flag shows the signal to be progressively scanned, the video distinction circuit 5 determines that the video signal is a progressive video signal. If the flag shows the signal to be interlaced scanned, the video distinction circuit 5 determines whether the video signal is an interlaced video signal or a pull-down video signal based on the periodicity of the video signal demodulated by the video demodulation circuit 6. The following describes in detail the judgment on whether a video signal is an interlaced video signal or a pull-down video signal based on the signal periodicity.

<Details of Video Distinction Circuit 5, Judgment on whether Signal is Interlaced Signal or Pull-Down Signal>

Figure 5:
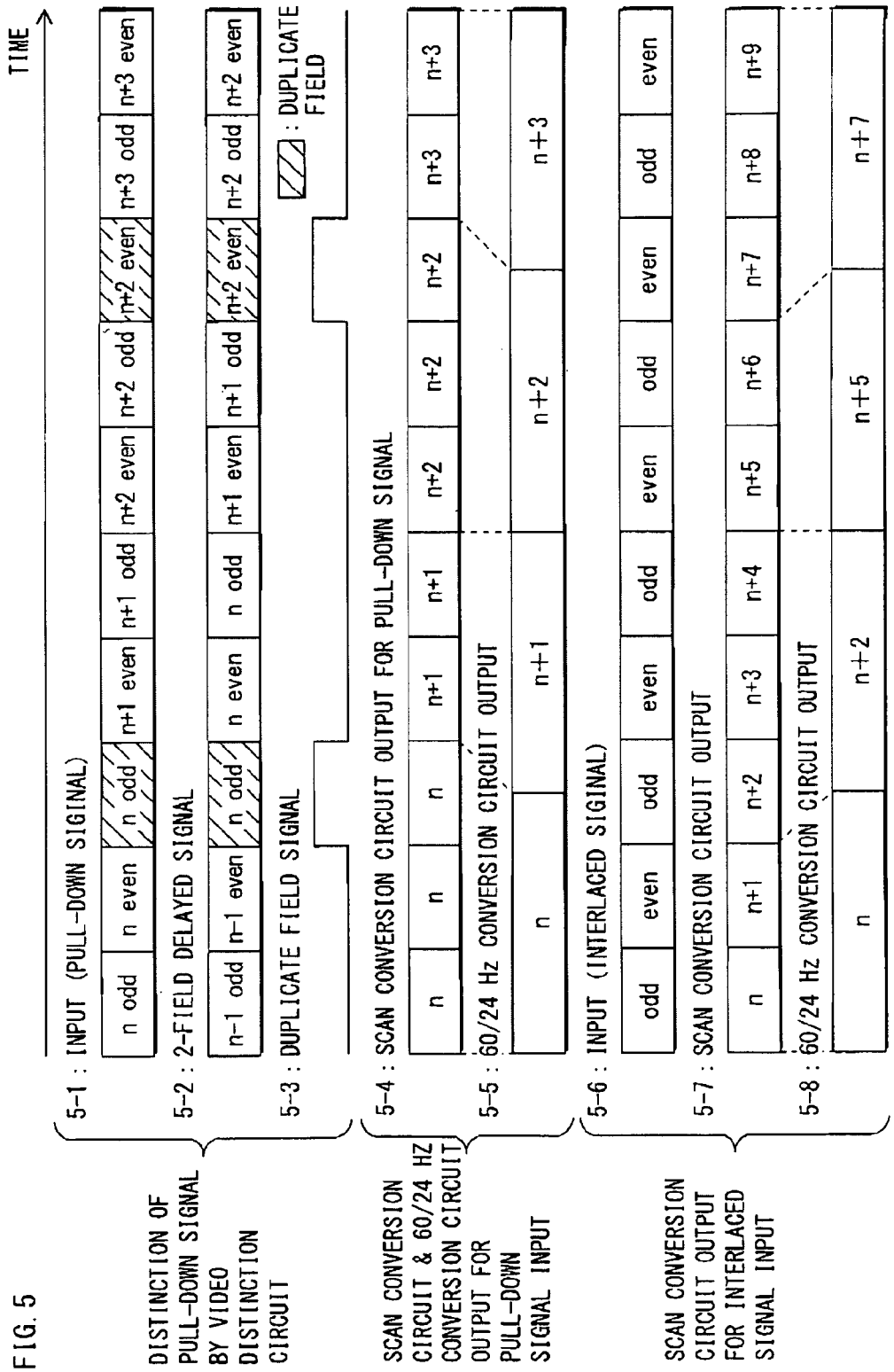
FIG. 5 shows the distinction of video type performed by a video distinction circuit 5 and the input/output to/from a scan conversion circuit 8 and a 60/24 Hz conversion circuit 9.

A level 5-1 in FIG. 5 shows a pull-down video signal. A feature of the 3:2 pull-down system is that duplicate fields are positioned once every five fields. A duplicate field is a field having the same content as a field positioned two fields previous.

The video distinction circuit 5 generates a delayed signal by delaying an input video signal by two fields. A level 5-2 in FIG. 5 shows a delayed signal generated by delaying a pull-down video signal by two fields.

Then, the video distinction circuit 5 compares the input video signal with the delayed signal to judge whether matching fields, that is, duplicate fields are included once every five fields. If the duplicate fields are included, the input video signal is a pull-down video signal. At this time, the video distinction circuit 5 generates a signal indicating duplicate fields (herein after, "duplicate field signal") as shown at a level 5-3 in FIG. 5. In this way, depending on whether matching of the input video signal and the delayed signal occurs once every five fields, the video distinction circuit 5 judges whether the input video signal is an interlaced video signal or a pull-down video signal. The video distinction circuit 5 notifies the scan conversion circuit 8 and the 60/24 Hz conversion circuit 9 of, as a type of video, a result of the judgment on whether or not the input video signal is a pull-down video signal.

<Video Demodulation Circuit 6>

The video demodulation circuit 6 demodulates compressed video signals input from the demodulation circuit 4 to obtain digital signals. The digital signals generated by the video demodulation circuit 6 are input to a contact point a of the switch 10, the 24/60 Hz conversion circuit 7, and the scan conversion circuit 8.

<24/60 Hz Conversion Circuit 7>

The 24/60 Hz conversion circuit 7 converts progressive video signals recorded at 24 Hz into 60 Hz progressive video signals, and outputs the 60 Hz progressive video signals to a contact point b of the switch 10. Levels 3-4 and 3-5 in FIG. 3 show processing procedure performed by the 24/60 Hz conversion circuit 7. The 24/60 Hz conversion circuit 7 converts each of frames n and n+2 among frames of a 24 Hz progressive video signal as shown at the level 3-4 into three fields. Each of frames n+1 and n+3 is converted into two fields. A 60 Hz progressive video signal as shown at the level 3-5 is obtained as a result.

<Scan Conversion Circuit 8>

The scan conversion circuit 8 converts an interlaced scan video signal among video signals output by the video demodulation circuit 6 into a 60 Hz progressive video signal, and outputs the 60 Hz progressive video signal to a contact point c of the switch 10 and the 60/24 Hz conversion circuit 9. Here, the interlaced scan video signal input by the video demodulation circuit 6 is scanned using different algorithms depending on whether or not the interlaced scan video signal is a pull-down video signal. The following describes an algorithm for converting a pull-down video signal to a 60 Hz progressive video signal with reference to FIG. 5.

The level 5-4 in FIG. 5 shows the output from the scan conversion circuit 8 in the case where the input signal is a pull-down video signal. The scan conversion circuit 8 locates breaks between the frames of a signal source at 24 fps in a state where 3-2 pull-down conversion has not yet been performed (herein after, "signal source before conversion"), based on the position of the duplicate fields. Then, the scan conversion circuit 8 combines the fields for each frame of the signal source before conversion.

For example, in the case where a duplicate field signal is output as shown at a level 5-3 in FIG. 5, the scan conversion circuit 8 classifies five fields from a field immediately subsequent to a duplicate field to a next duplicate field into fields constituting two frames of the signal source before conversion, using the output timing of the duplicate field signal as indicating the breaks of frames n and n+2 at the signal source before conversion. This conversion of the progressive video signal results in the frames n, n, n, n+1, n+1, n+2, n+2, n+2, n+3, n+3 being obtained, as shown at the level 5-4.

Levels 5-6 and 5-7 in FIG. 5 show the input/output to/from the scan conversion circuit 8 in the case where the input signal is not a pull-down video signal. If the input signal is an interlaced video signal as shown at the level 5-6, the scan conversion circuit 8 converts the interlaced video signal to obtain a 60 Hz progressive video signal as shown at the level 5-7.

There exist two types of interlaced video signals: signals obtained by performing 3:2 pull-down on film martial and signals obtained from video camera material. Since the scan conversion circuit 8 must wait for the video distinction circuit 5 to determine which of these two types an interlaced video signal belongs to, the interlaced video signal is initially input to the scan conversion circuit 8. After the video distinction circuit 5 has determined the signal type, the scan conversion circuit 8 switches processing to perform an algorithm on the interlaced video signal depending on the determined signal type.

<60/24 Hz Conversion Circuit 9>

The 60/24 Hz conversion circuit 9 converts 60 Hz progressive video signals output from the scan conversion circuit 8 into 24 Hz progressive video signals, and outputs the converted video signals to a contact point d of the switch 10. Specifically, if a video type of the video signal is pull-down video, the 60/24 Hz conversion circuit 9 converts the video signal output from the scan conversion circuit 8 as shown at the level 5-4 in FIG. 5 into a 24 Hz video signal as shown at a level 5-5 in FIG. 5. As described above, the pull-down video signal is a signal in which each frame of the original 24 fps video as a signal source has been converted into alternately two and three fields. In this case, the video signal is converted back into the original 24 Hz video signal in a state where the 3-2 pull-down conversion has not yet been performed.

According to the 3-2 pull-down conversion, three continuous frames converted from one frame of the signal source before conversion and two continuous frames converted from one frame immediately subsequent to the one frame of the signal source before conversion are repeatedly output in an alternate manner. This makes movement of video choppy. The above conversion by the scan conversion circuit 8 and the 60/24 Hz conversion circuit 9 is necessary in order to eliminate this choppy movement.

Also, when the input video signal is an interlaced video signal, the 60/24 Hz conversion circuit 9 converts the input video signal into a 24 Hz signal as shown at a level 5-8 in FIG. 5. The original video signal is a 60 Hz video signal, and accordingly frames n+1, n+3, n+4, n+6, n+8, and n+9 are thinned out from the original video as shown at a level 5-7 in FIG. 5. As a result, only frames n, n+2, n+5, and n+7 are output as shown at a level 5-8 in FIG. 5. Therefore, the 24 Hz progressive video signal that has been converted from the interlaced video signal results in video with unnatural movement due to thinning of frames.

<Switch 10>

The switch 10 selectively outputs the output from the video demodulation circuit 6, the 24/60 Hz conversion circuit 7, the scan conversion circuit 8, and the 60/24 Hz conversion circuit 9 to the output setup GUI addition unit 11, by connecting to any of the contact points a, b, c and d.

<Output Setup GUI Addition Unit 11>

The output setup GUI addition unit 11 functions as the GUI generation unit. Upon receiving an instruction from the output rate setup unit 18, the output setup GUI addition unit 11 generates an On Screen Display (OSD) graphics for causing the user to select which of the video rate and the film rate for outputting video signals. The output setup GUI addition unit 11 adds the generated OSD graphics to video signals input from the switch 10, and outputs the video signals having the OSD graphics added thereto to the digital conversion circuit 12.

<Digital Conversion Circuit 12>

The digital conversion circuit 12 converts one of 24 Hz and 60 Hz progressive video signals input from the output setup GUI addition unit 11 into an HDMI digital video signal, and outputs a result of the conversion to the hybrid monitor 400 or the 60 Hz monitor 500 via the HDMI terminal 13. The video signal is displayed as a result.

<HDMI Terminal 13>

The HDMI terminal 13 is compliant with the HDMI standards, and includes both a transmission line for digitally converted video signals and a serial transmission line for intercommunication as defined in the VESA/E-DDC and EIA/CEA 861B standards. The HDMI terminal 13 is connected to the hybrid monitor 400 or the monitor 500. Since the hybrid monitor 400 and the monitor 500 each has a ROM storing information on the standards for video displayable by the respective monitor (EDID: Extended Display Identification Data), this information can be read via the serial transmission line.

<Display Capacity Judgment Unit 14>

The display capacity judgment unit 14 reads the "information on the standards for video displayable by the respective monitor (EDID)" from the ROM included in a monitor connected to the playback device via the serial transmission line, and judges whether the connected monitor is the hybrid monitor 400 or the 60 Hz monitor 500 based on the read information. The display capacity judgment unit 14 notifies the switch control circuit 19 and the mode setup unit 16 of a result of the judgment.

<Playback Setup Unit 15>

In accordance with an instruction input by the user, the playback setup unit 15 controls the blocks relating to setup of the operation mode of the playback device and playback of the optical disc 1.

Upon receiving an instruction to set the operation mode of the playback device from the user, the playback setup unit 15 sets the operation status of the mode setup unit 16 to the activated status. By performing the procedure described later, the playback setup unit 15 causes the mode setup unit 16 to set the operation mode to one of the film rate permission mode and the film rate prohibition mode.

Upon receiving an instruction to play back the optical disc 1 from the user, the playback setup unit 15 controls the optical pickup 2 and the motor 3 to start reading signals from the optical disc 1. Upon receiving, from the optical pickup 2, a notification that the signals have been read using the DVD pickup 2a, the playback setup unit 15 sets the operation status of the output rate setup unit 18 to the activated status. Then, by performing the procedure described later, the playback setup unit 15 sets the output frame rate of video signals to be switchable between 24 fps (film mode) and 60 fps (video mode) in response to user operations.

<Mode Setup Unit 16 and Mode Setup GUI Generation Unit 17>

The mode setup GUI generation unit 17 functions as the GUI generation unit, and generates GUIs written using an OSD graphics and a Broadcast Markup Language (BML), and outputs the generated GUIs to the hybrid monitor 400 for display.

Figure 6:
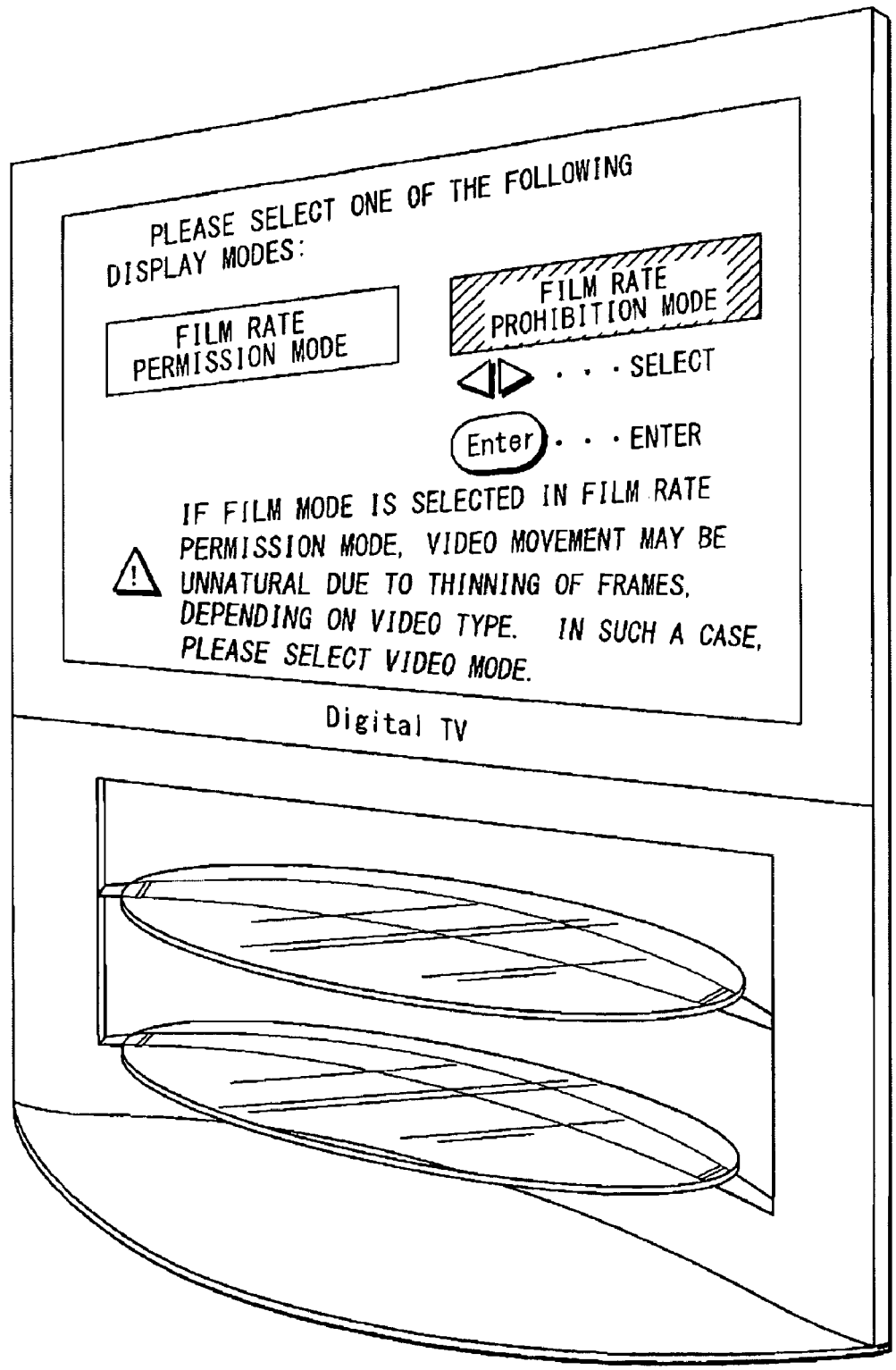
FIG. 6 shows a GUI generated by a mode setup GUI generation unit 17.

When the operation status of the mode setup unit 16 has been set to the activated status by the playback setup unit 15, the mode setup unit 16 controls the mode setup GUI generation unit 17 to generate a GUI for receiving the operation mode settings and output the generated GUI to the hybrid monitor 400. FIG. 6 shows a GUI generated by the mode setup GUI generation unit 17. Buttons shown in FIG. 6 are for respectively receiving the film rate permission mode and the film rate prohibition mode, and may be normal, focused, or activated.

The "film rate prohibition mode" is an operation mode in which the frame rate is always fixed to 60 fps during playback. The "film rate permission mode" is an operation mode in which the frame rate is switchable between 60 fps and 24 fps by the user during playback.

In FIG. 6, the user is able to switch the focused button by depressing RIGHT or LEFT arrow keys on the remote controller 300. The mode setup unit 16 sets the current mode of the playback device to the mode corresponding to the currently focused button when the ENTER key is depressed. The most remarkable feature of this GUI is that it informs the user of the demerit of setting the operation mode of the playback device to the film rate permission mode in order to improve the user's understanding of the demerit. The warning shown in FIG. 6, namely, "IF FILM MODE IS SELECTED IN FILM RATE PERMISSION MODE, VIDEO MOVEMENT MAY BE UNNATURAL DUE TO THINNING OF FRAMES, DEPENDING ON VIDEO TYPE. IN SUCH A CASE, PLEASE SELECT VIDEO MODE.", expresses the demerit of setting the operation mode to the film rate permission mode. Given that the user is informed of the demerit of setting the operation mode to the film rate permission mode, the film rate prohibition mode is focused as the default settings. Accordingly, in the case where video signals to be played back are mixed signals including interlaced video signals, the user sets the operation mode to the film rate permission mode after being informed that video signals played back in the film rate permission mode might cause video with unnatural movement. Therefore, even if playback of interlaced video signals in the film rate permission mode causes video with unnatural movement due to thinning out of frames, product complaints will not arise.

<Output Rate Setup Unit 18>

The output rate setup unit 18 functions as the change reception unit. The operation status of the output rate setup unit 18 is set to the activated status by the playback setup unit 15. While the operation mode of the playback device is set to the film rate permission mode, the output rate setup unit 18 in the activated status switches the output frame rate between 60 fps (video mode) and 24 fps (film mode) in accordance with an instruction by the user.

Specifically, the remote controller 300 includes a "RATE CHANGE" button. When the user presses the "RATE CHANGE" button to request display of a GUI for output setup, the output rate setup unit 18 starts performing the output frame rate switching processing. Firstly, the output rate setup unit 18 instructs the output setup GUI addition unit 11 to display a setup function of the output frame rate to be superimposed on video information being played back. Then, one of 24 fps (film mode) and 60 fps (video mode) is selected via the GUI, and the output rate setup unit 18 notifies the switch control circuit 19 of the selected output frame rate.

Figure 7:
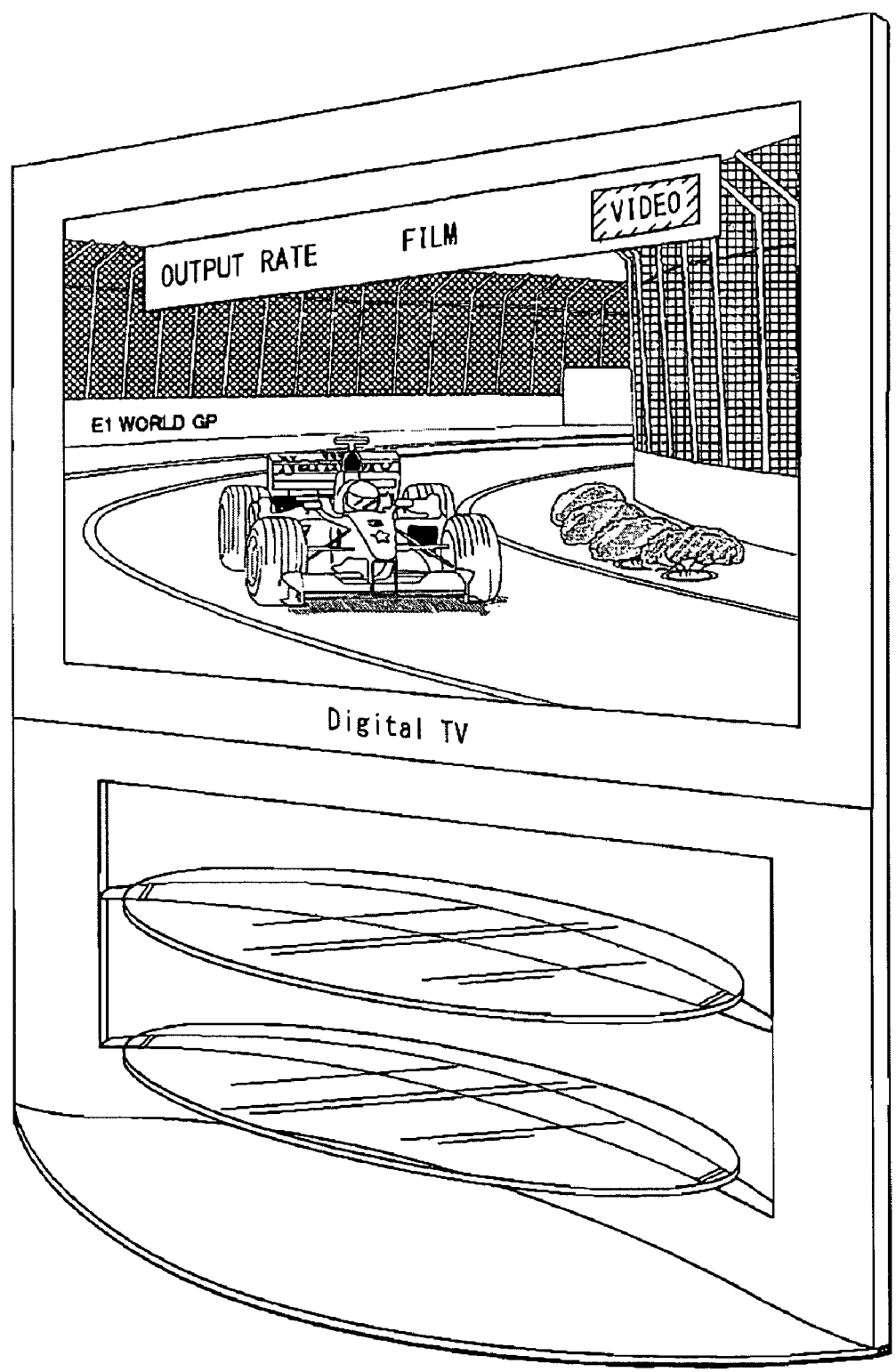
FIG. 7 shows a GUI generated by an output setup GUI addition unit 11.

FIG. 7 shows a GUI generated by the output setup GUI addition unit 11. In FIG. 7, display buttons "FILM" and "VIDEO" are each a button showing a output frame rate to be switched, and may be normal, focused, or activated. The display buttons "FILM" and "VIDEO" respectively correspond to the 24 fps rate (film mode) and the 60 fps rate (video mode). The default settings of the GUI for output settings are set with the button corresponding to the current output frame rate as the focused button.

In FIG. 7, the user is able to switch the focused button by depressing the RIGHT or LEFT arrow keys on the remote controller 300. The output rate setup unit 18 sets the output frame rate of video signals in the playback device, to the output frame rate corresponding to the currently focused button when the ENTER key is depressed.

As described above, if interlaced video signals are output at 24 fps film rate during playback of the optical disc 1 in the film rate permission mode, movement of video will be unnatural. However, the user can easily switch the output frame rate of video signals to 60 fps so as to avoid inconvenience by performing the above operations even during playback. Therefore, even if video with unnatural movement occurs during playback, product complaints will not arise.

<Switch Control Circuit 19>

The switch control circuit 19 controls the switch 10 in accordance with the combination of the type of video streams recorded on the optical disc 1, the type of monitor connected to the playback device, information transmitted from the playback setup unit 15, and notification from the output rate setup unit 18. The switch control circuit 19 is described in detail below.

<Details Part. 1 of Switch Control Circuit 19>

(Case where Connected with Hybrid Monitor 400 and Signals are Output at 24 fps (Film Rate))

Figure 8:
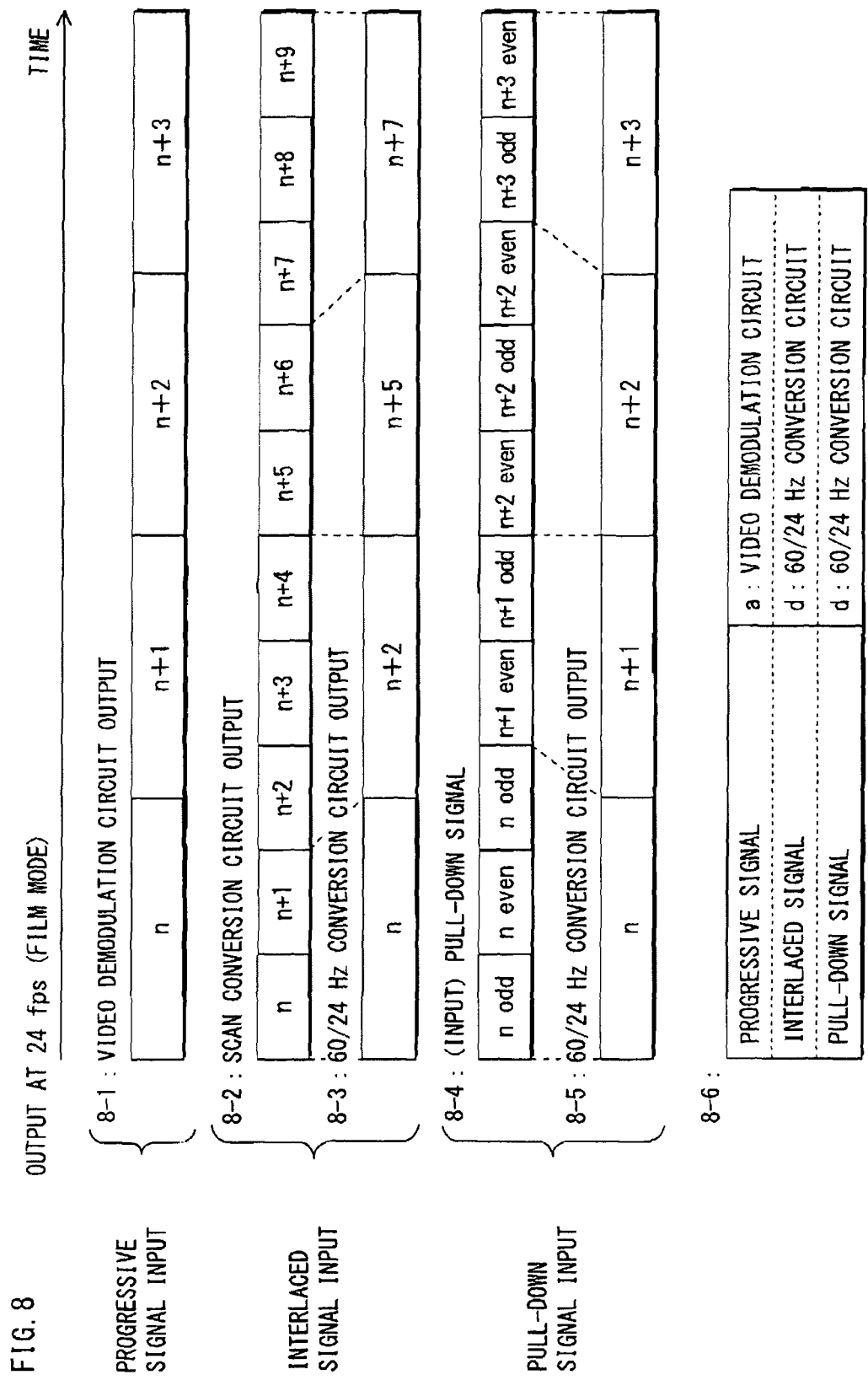
FIG. 8 shows the input/output to/from the scan conversion circuit 8 and the 60/24 Hz conversion circuit 9 in association with switching controls by a switch control circuit 19, in the case where the playback device is connected with a hybrid monitor 400 and a film mode has been set in the playback device.

FIG. 8 shows the input/output to/from the scan conversion circuit 8 and the 60/24 Hz conversion circuit 9 in association with switching controls by the switch control circuit 19, in the case where the playback device is connected with the hybrid monitor 400 and the film mode has been set in the playback device.

A level 8-1 in FIG. 8 shows the through-output of a progressive video signal to the contact point a of the switch 10. A level 8-2 in FIG. 8 shows the output from the scan conversion circuit 8 in the case where an interlaced video signal is input. A level 8-3 in FIG. 8 shows the output from the 60/24 Hz conversion circuit 9 in the case where an interlaced video signal is input. Levels 8-4 and 8-5 in FIG. 8 show the input/output to/from the 60/24 Hz conversion circuit 9 in the case where a pull-down video signal is input. As shown at the level 8-3, the 60/24 Hz conversion circuit 9 converts each frame of the original video of the pull-down video signal into a 60 fps frame.

A level 8-6 in FIG. 8 shows switching controls by the switch control circuit 19 when the input/output to/from the video demodulation circuit 6, the scan conversion circuit 8, and the 60/24 Hz conversion circuit 9 is as shown at the levels 8-1 to 8-5.

When a progressive video signal is input, the switch control circuit 19 sets the switch 10 to the contact point a, and through-outputs the output of the video demodulation circuit 6 to the output setup GUI addition unit 11.

When a pull-down video signal is input as shown at the level 8-4, the switch control circuit 19 sets the switch 10 to the contact point d, and outputs the output from the 60/24 Hz conversion circuit 9 to the output setup GUI addition unit 11, as shown at the level 8-5. As a result, a 24 fps video signal is output.

Also, when an interlaced video signal is input, the switch control circuit 19 sets the switch 10 to the contact point d, and through-outputs the output from the 60/24 Hz conversion circuit 9 to the output setup GUI addition unit 11. As a result, a 24 fps video signal is output.

That is, in the case where the playback device is connected with the hybrid monitor 400 and the output frame rate set in the playback device is 24 fps (film mode), 24 Hz video signals are always output to the output setup GUI addition unit 11.

<Details Part. 2 of Switch Control Circuit 19>
(Case where Signals are Output at 60 fps (Video Mode))

Figure 9:
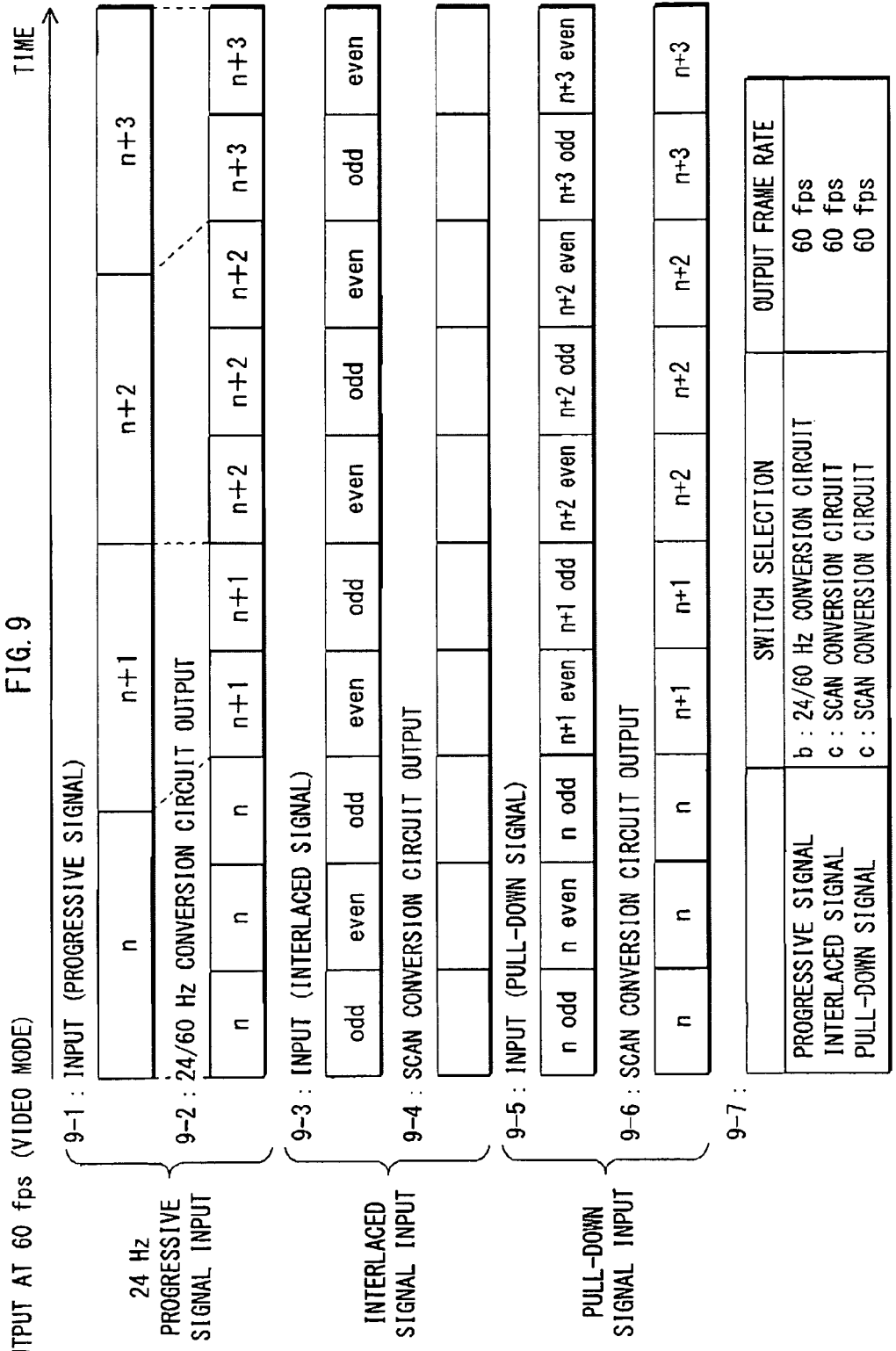
FIG. 9 shows the input/output to/from the 24/60 Hz conversion circuit 7 and the scan conversion circuit 8 in association with switching controls by the switch control circuit 19, in the case where the playback device is connected with the hybrid monitor 400 and a video mode has been set in the playback device or in the case where the playback device is connected with a 60 Hz monitor 500.

FIG. 9 shows the input/output to/from the 24/60 Hz conversion circuit 7 and the scan conversion circuit 8 in association with switching controls by the switch control circuit 19, in the case where the playback device is connected with the hybrid monitor 400 and the video mode has been set in the playback device or in the case where the playback device is connected with the 60 Hz monitor 500.

Levels 9-1 and 9-2 in FIG. 9 show the input/output to/from the 24/60 Hz conversion circuit 7 in the case where a progressive video signal is input. The 24/60 Hz conversion circuit 7 converts each frame of the original 24 fps video of the progressive video signal as shown at the level 9-1 into alternately two and three frames. As a result, a 60 Hz progressive video signal is obtained as shown at the level 9-2. Levels 9-3 and 9-4 in FIG. 9 show the input/output to/from the scan conversion circuit 8 in the case where an interlaced video signal is input. The interlaced video signal as shown at the level 9-3 is converted to a 60 Hz progressive video signal as shown at the level 9-4.

Levels 9-5 and 9-6 in FIG. 9 show the input/output to/from the scan conversion circuit 8 in the case where a pull-down video signal is input. The pull-down video signal as shown at the level 9-5 is converted to a 60 Hz progressive video signal as shown at the level 9-6. A level 9-7 shows switching controls by the switch control circuit 19 when the input/output to/from the 24/60 Hz conversion circuit 7 and the scan conversion circuit 8 is as shown at the levels 9-1 to 9-6.

If a 24 Hz progressive video signal is input, the switch control circuit 19 sets the switch 10 to the contact point b, and outputs the output from the 24/60 Hz conversion circuit 7 to the output setup GUI addition unit 11.

If an interlaced video signal or a pull-down video signal is input, the switch control circuit 19 sets the switch 10 to the contact point c, and outputs the output from the scan conversion circuit 8 to the output setup GUI addition unit 11. Accordingly, 60 Hz video signals are always output to the output setup GUI addition unit 11.

That is, in the case where the playback device is connected with the hybrid monitor 400 and the output frame rate set in the playback device is 60 fps (video mode), or in the case where the playback device is connected with the 60 Hz monitor 500, 60 Hz video signals are always output to the output setup GUI addition unit 11 as a result of the above switching.

<Details Part. 3 of Switch Control Circuit 19>

When the playback setup unit 15 instructs the mode setup unit 16 to set the operation mode of the playback device in response to operations of the user, the switch control circuit 19 sets the switch 10 to the contact point e. As a result, while the operation mode is being set in the playback device, the GUI for receiving the settings of the operation mode shown in FIG. 6 is displayed. This enables the user to select one of the film rate permission mode and the film rate prohibition mode by performing the above operations.

Therefore, when hoping to play back video with image quality prioritized, the user firstly selects the film rate permission mode. Then, the user can operate the GUI shown in FIG. 7 during playback so as to appropriately switch the output frame rate between 24 fps (film mode) and 60 fps (video mode), depending on the contents of the disc. Here, switching of the output frame rate causes re-synchronization of the HDMI connection. However, since the user has explicitly switched the output frame rate, the user has already predicted occurrence of such re-synchronization. Therefore, product complaints will not arise.

<Software>

The following describes the use of software to implement the display capacity judgment unit 14, the playback setup unit 15, the mode setup unit 16, the output rate setup unit 18, and the switch control circuit 19. The display capacity judgment unit 14, the playback setup unit 15, the mode setup unit 16, the output rate setup unit 18, and the switch control circuit 19 can be implemented in the playback device by creating a program that performs the processing procedure shown in FIG. 10 and FIG. 11 and having a CPU execute the created program.

Figure 10:
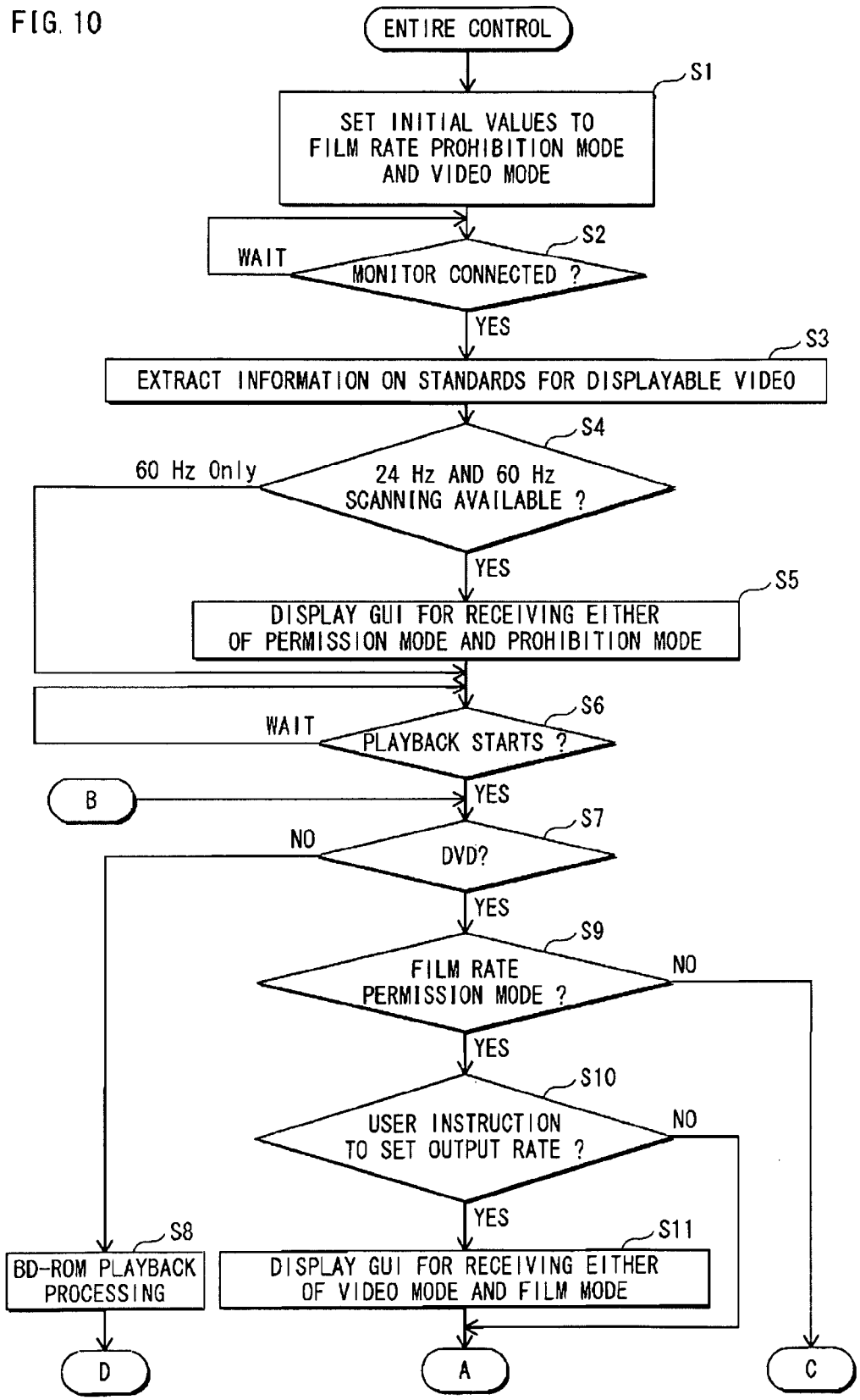
FIG. 10 is a flow chart showing part of the entire control procedures of the playback device performed by a display capacity judgment unit 14, a playback setup unit 15, a mode setup unit 16, an output rate setup unit 18, and the switch control circuit 19.
Figure 11:
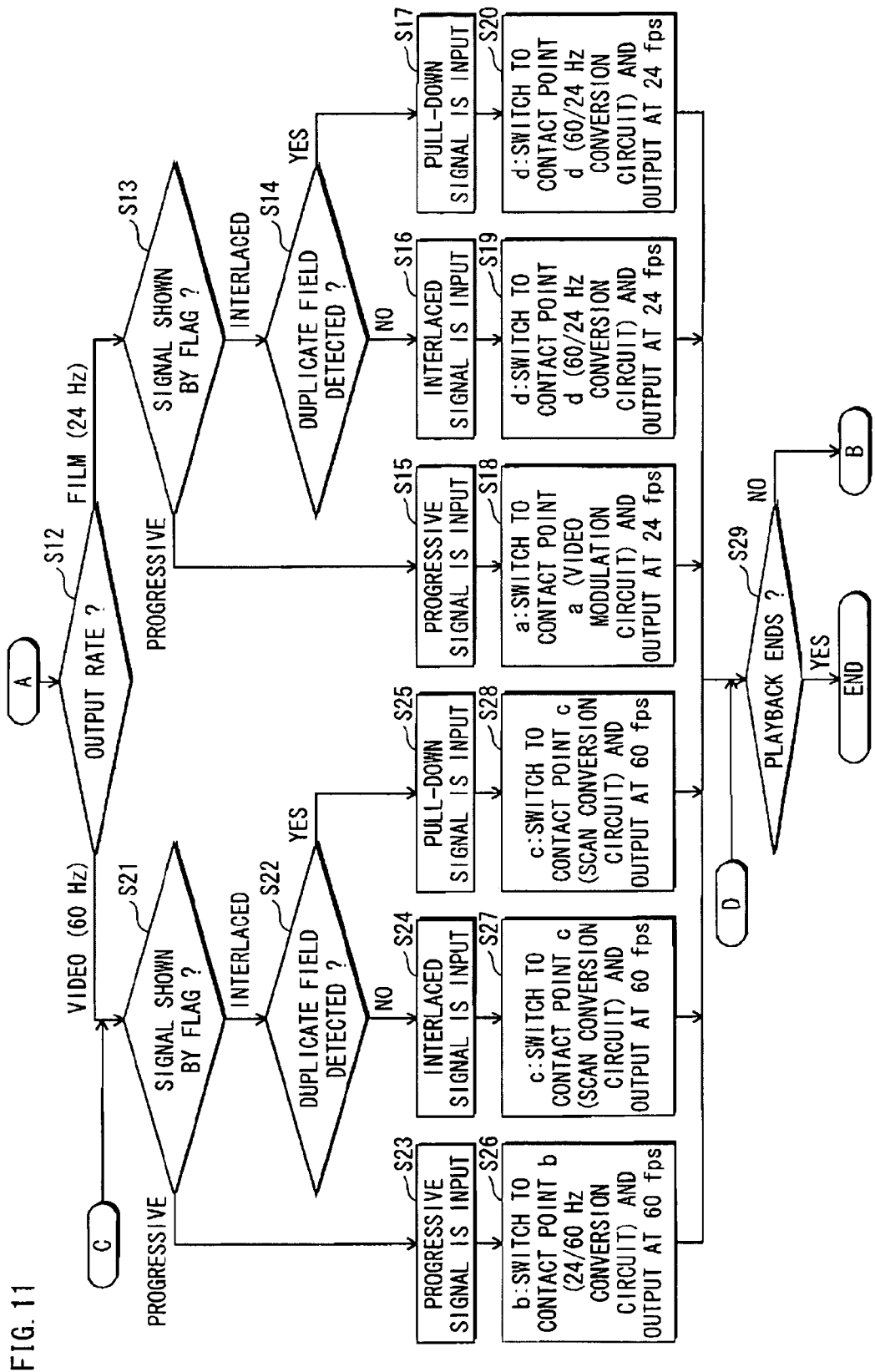
FIG. 11 is a flow chart showing part of the entire control procedures of the playback device performed by the display capacity judgment unit 14, the playback setup unit 15, the mode setup unit 16, the output rate setup unit 18, and the switch control circuit 19.

FIG. 10 and FIG. 11 are flow charts showing the entire control procedures of the playback device performed by the display capacity judgment unit 14, the playback setup unit 15, the mode setup unit 16, the output rate setup unit 18, and the switch control circuit 19.

In FIG. 10 and FIG. 11, when the playback device is started up, as the initialization setup processing in Step S1, the mode setup unit 16 sets the operation mode to the film rate prohibition mode, and the output rate setup unit 18 sets the output frame rate to 60 fps. Then, loop processing is performed in Step S2. Step S2 involves judgment on whether the playback device is connected with a monitor. If it is judged that the playback device is connected with the monitor, the flow proceeds to Step S3. In Step S3, the display capacity judgment unit 14 extracts the information on the standards for displayable video from the monitor via an HDMI serial transmission line for intercommunication. In Step S4, the playback setup unit 15 switches whether to perform the operation mode setup processing in Step 5, based on the information on the displayable video standards extracted by the display capacity judgment unit 14. If the connected monitor is capable of performing only 60 Hz scan, the flow proceeds to Step S6. If the connected monitor is capable of performing both 24 Hz scan and 60 Hz scan, the playback setup unit 15 causes the mode setup unit 16 to perform the processing in Step S5.

Step S5 involves the operation mode setup processing of displaying a GUI for receiving one of the film rate permission mode and the film rate prohibition mode, and receiving the selected operation mode. Specifically, the mode setup unit 16 causes the mode setup GUI generation unit 17 to generate a GUI shown in FIG. 6, and receives the operation mode selected by the user via the remote controller 300.

Step S6 involves processing of waiting for a playback instruction from the user. Specifically, the playback setup unit 15 waits for the user to issue a playback instruction by operating the remote controller 300. Upon receiving the playback instruction, the playback setup unit 15 controls the optical pickup 2 and the motor 3 to start reading signals from the optical disc 1. At this time, a control circuit of the optical pickup 2 notifies the playback setup unit 15 which of the DVD pickup 2a and the BD pickup 2b has been used for reading the signals.

If the used pickup is the BD pickup 2b (Step S7: NO), the flow proceeds to Step S8, and playback processing optimized for BD-ROMs is performed until completion of playback. It may be possible to apply, as the playback processing optimized for BD-ROMs, the art disclosed in Japanese Laid-Open Patent Application Publication No. 2006-222938. On the other hand, if the used pickup is the DVD pickup 2a (Step S7: YES), the flow proceeds to Step 9, and playback processing optimized for DVD-Videos is performed. The following mainly describes the playback processing optimized for DVD-Video including processing that is a characteristic feature of the present invention.

In Step S9, the playback setup unit 15 judges whether the set operation mode is the film rate permission mode or the film rate prohibition mode. If the operation mode is the film rate permission mode, the flow proceeds to Step S10. If the operation mode is the film rate prohibition mode, the flow proceeds to Steps S21 to S28 to perform playback processing at a video rate via the point C in FIG. 11.

In Step S10, the output rate setup unit 18 checks whether the user has requested to change the output frame rate. Specifically, it is detected whether the user has depressed the button "RATE CHANGE" of the remote controller 300 to request to change the output frame rate. If the user's request to change the output frame rate is detected (Step S10: YES), the output rate setup unit 18 causes the user to set the output frame rate to one of 24 fps (film mode) and 60 fps (video mode) in Step S11. Then, playback processing is performed in Step S12 and subsequent Steps. If the user's request to change the output frame rate is not detected (Step S10: NO), the flow skips Step 11 and proceeds to Step 12, and then playback processing is performed subsequently.

In Step S11, the output rate setup unit 18 instructs the output setup GUI addition unit 11 to add the GUI shown in FIG. 7. The output rate setup unit 18 receives an instruction to change the output frame rate from the user operating the remote controller 300, and changes the output frame rate in accordance with the user's instruction.

Steps S12 to S28 constitute the processing that is the main point of the first embodiment. Depending on the settings of the output frame rate in Step S12, the flow branches to playback at the film rate in Steps S13 to S20 and playback at the video rate in Steps S21 to S28. If the flow branches to playback at the film rate, the switch control circuit 19 switches the switch 10 to the contact point a (Step S18) or switches the switch 10 to the contact point d (Steps S19 or S20), based on results of Steps S13 and S14. If the flow branches to playback at the video rate, the switch control circuit 19 switches the switch 10 to the contact point b (Step S26) or switches the switch 10 to the contact point c (Steps S27 or S28), based on results of Steps S21 and S22.

Firstly, the processing in Step S12 is described. In Step S12, the switch control circuit 19 judges whether the output frame rate is set to 60 fps (video mode) or 24 fps (film mode), based on a notification from the output rate setup unit 18. If the output frame rate is set to 24 fps (film mode), the flow proceeds to Step S13. If the output frame rate is set to 60 fps (video mode), the flow proceeds to Step S21.

<Playback at Film Rate>

In Steps S13 to S20 of performing playback at the film rate, the switch control circuit 19 performs any one of processing of Steps S18 to S20 to switch the contact point based on results of judgments in Steps S13 and S14.

In Step S13, the video distinction circuit 5 judges whether a flag relating to a video signal shows progressive scan. If the flag shows progressive scan, the video distinction circuit 5 judges the input video signal is a progressive video signal, and notifies the switch control circuit 19 of a result of the judgment (Step S15). Upon receiving the notification of the result of the judgment, the switch control circuit 19 switches the contact point (Step S18).

On the other hand, if the flag relating to the video signal shows interlaced scan, the video distinction circuit 5 further makes a judgment (Step S14). Specifically, the video distinction circuit 5 judges whether duplicate fields are included in the video signal. If duplicate fields are included (Step S14: YES), the video distinction circuit 5 judges that the input single is a pull-down video signal, and notifies the switch control circuit 19 of a result of the judgment (Step S17). Upon receiving the notification of the result of the judgment, the switch control circuit 19 switches the contact point (Step S20).

If duplicate fields are not included (Step S14: NO), the video distinction circuit 5 judges that the input single is an interlaced video signal, and notifies the switch control circuit 19 of a result of the judgment (Step S16). Upon receiving the notification of the result of the judgment, the switch control circuit 19 switches the contact point (Step S19).

<Playback at Video Rate>

In Steps S21 to S28 of performing playback at the video rate, the switch control circuit 19 performs any one of processing of Steps S26 to S28 to switch the contact point based on results of judgments in Steps S21 and S22.

In Step S21, the video distinction circuit 5 judges whether a flag relating to a video signal shows progressive scan. If the flag shows progressive scan, the video distinction circuit 5 judges the input signal is a progressive video signal, and notifies the switch control circuit 19 of a result of the judgment (Step S23). Upon receiving the notification of the result of the judgment, the switch control circuit 19 switches the contact point (Step S26).

On the other hand, the flag relating to the video signal shows interlaced scan, the video distinction circuit 5 further makes a judgment (Step S22). Specifically, the video distinction circuit 5 judges whether duplicate fields are included in the input signal. If duplicate fields are included (Step S22: YES), the video distinction circuit 5 judges the input signal is a pull-down video signal, and notifies the switch control circuit 19 of a result of the judgment (Step S25). Upon receiving the notification of the result of the judgment, the switch control circuit 19 switches the contact point (Step S28).

If duplicate fields are not included (Step S22: NO), the video distinction circuit 5 judges that the input signal is an interlaced video signal, and notifies the switch control circuit 19 of a result of the judgment (Step S24). Upon receiving the notification of the result of the judgment, the switch control circuit 19 switches the contact point (Step S27).

After completion of the above processing of switching the contact point in any of Steps S18 to S20 and Steps S26 to S28, the flow proceeds to Step S7 via the point B in FIG. 10 repeatedly as long as video signals continue to be input. In Step S29, if receiving a stop instruction from the user, or if receiving detection that playback completes to the end of the AV file, the playback setup unit 15 ends the playback. This completes the description of the entire control of the playback device shown in FIG. 10 and FIG. 11.

According to the first embodiment as described above, the playback device detects the frame rate of video signals read from the recording medium and the available frame rate of the monitor connected with the playback device. Depending on a result of the detection, the playback device can change the output frame rate of video signals. In addition, the user can select whether to display video signals at 24 fps (film mode) or 60 fps (video mode). Therefore, even if playback of interlaced material at 24 fps (film mode) results in video with unnatural movement due to thinning of frames, the user can easily change the output frame rate back to 60 fps (video mode).

Also, the output frame rate has been set to 60 fps (video mode) as the default settings. Accordingly, unless the user expressly sets the operation mode to the film rate permission mode, the user cannot select output at 24 fps (film mode) during playback. Furthermore, when the user permits output at 24 fps (film mode), the precaution statement is displayed on the screen via the GUI. This exhibits an advantage that a user with low knowledge on output at 24 fps (film mode) make less mistakes.

Furthermore, only in the case where a display device connected with the playback device is capable of displaying both 60 Hz and 24 Hz video signals, the user is permitted to select the film rate permission mode in which signal output at 24 fps is permitted. This can eliminate any inconvenience that may arise from the user being permitted to select the mode for performing signal output at 24 fps despite the display device only being capable of displaying 60 Hz video signals. Being able to eliminate such inconvenience enables full advantage to be taken of 24 Hz signal output, and allows the user to experience the joys of high quality video.

Furthermore, according to the first embodiment, via the GUI for receiving the operation mode from the user which is displayed on the display device, it is warned that output of video signals at 24 fps might cause video with unnatural movement due to thinning of frames. In this way, since the user is only permitted to select the mode that permits output at 24 fps after being informed of the possibility of video with unnatural movement due to thinning of frames, product complaints are unlikely to arise even if movement of video becomes unnatural due to thinning of frames during playback.

(Second Embodiment)

The second embodiment assumes that a monitor connected with the playback device is multiscan. A multiscan monitor is a monitor that performs display at a scan rate specified by the playback device. In the second embodiment, the multiscan monitor is made to perform video playback by scanning at 48 Hz that is an integer multiple of 24 Hz. Film material is suitable for display at 24 fps as described in the first embodiment. However, flicker might occur in the case of output at 24 fps. With film projectors in movie theaters designed to avoid flicker, each frame is projected twice. Therefore, by having the playback device according to the second embodiment perform video display at 48 fps, display quality comparable to that of a movie theater is achieved.

Figure 12:
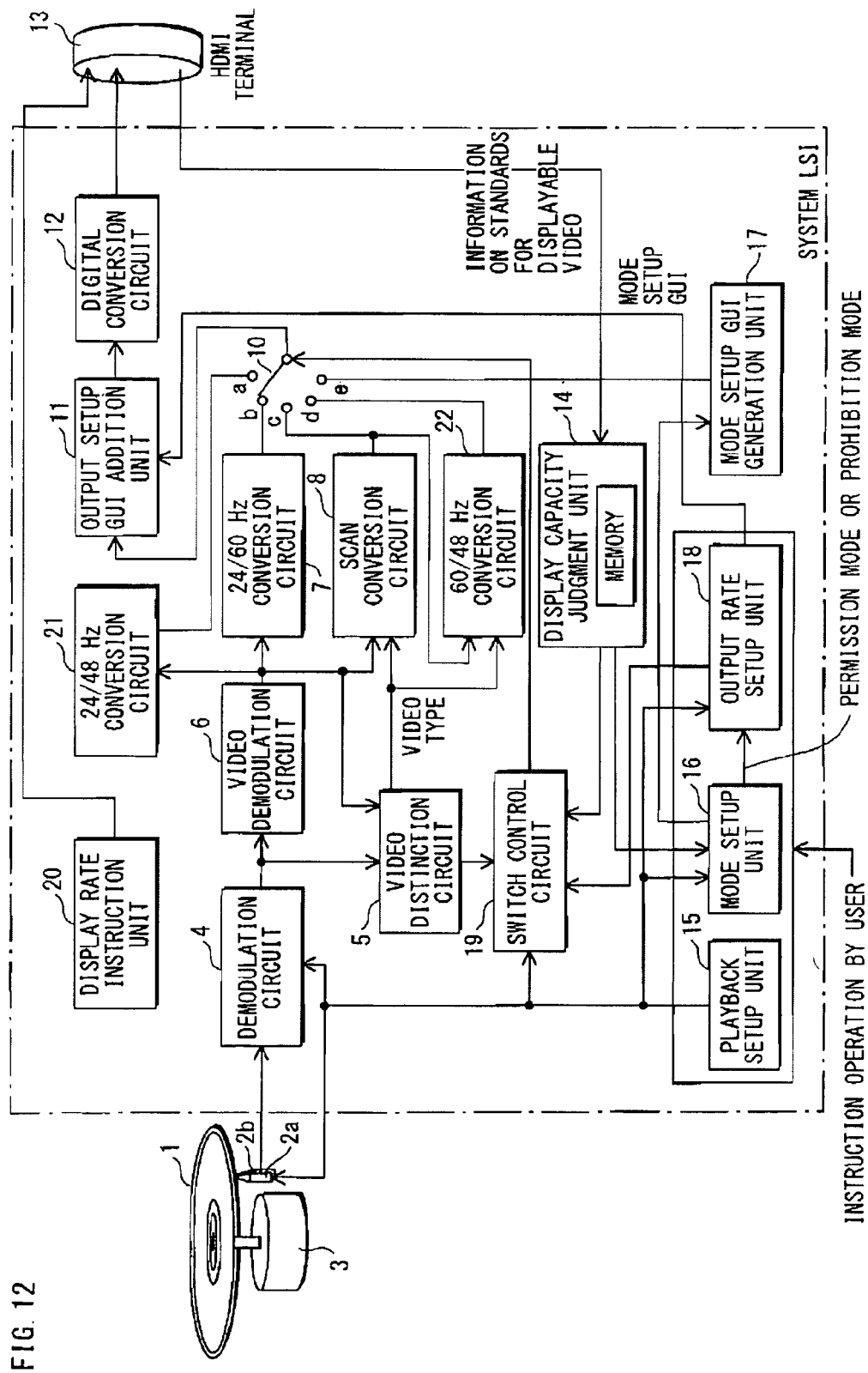
FIG. 12 shows the internal structure of a playback device according to a second embodiment of the present invention.

The internal structure of a playback device according to the second embodiment is described below. FIG. 12 shows the internal structure of the playback device according to the second embodiment. As shown in FIG. 12, the playback device relating to the second embodiment additionally includes a display rate instruction unit 20 and a 24/48 Hz conversion circuit 21, while the 60/24 Hz conversion circuit 9 has been replaced with a 60/48 Hz conversion circuit 22. Because of the addition of these constituent elements, the display capacity judging unit 14 and the switch control circuit 19 perform the following processing particular to the second embodiment. 48 fps video signals are output in the film mode instead of 24 fps video signals. These improvements and additional constituent elements are described below.

<Improvement of Display Capacity Judgment Unit 14 in Second Embodiment>

The display capacity judgment unit 14 extracts the "information on the standards for video displayable by the respective monitor" from the ROM provided in the connected monitor via the serial transmission line, and judges whether the monitor is multiscan based on the extracted information.

<Display Rate Instruction Unit 20>

If the display capacity judgment unit 14 judges that a monitor connected with the playback device is a multiscan monitor, the display rate instruction unit 20 notifies the monitor connected with the playback device via HDMI of a scan rate to be used for output, which is set by the output rate setup unit 18. This scan rate is 48 fps or 60 fps described above. When the output rate setup unit 18 changes the settings of the scan rate, the display rate instruction unit 20 instructs the monitor to perform display at the changed scan rate.

<24/48 Hz Conversion Circuit 21>

Figure 13:
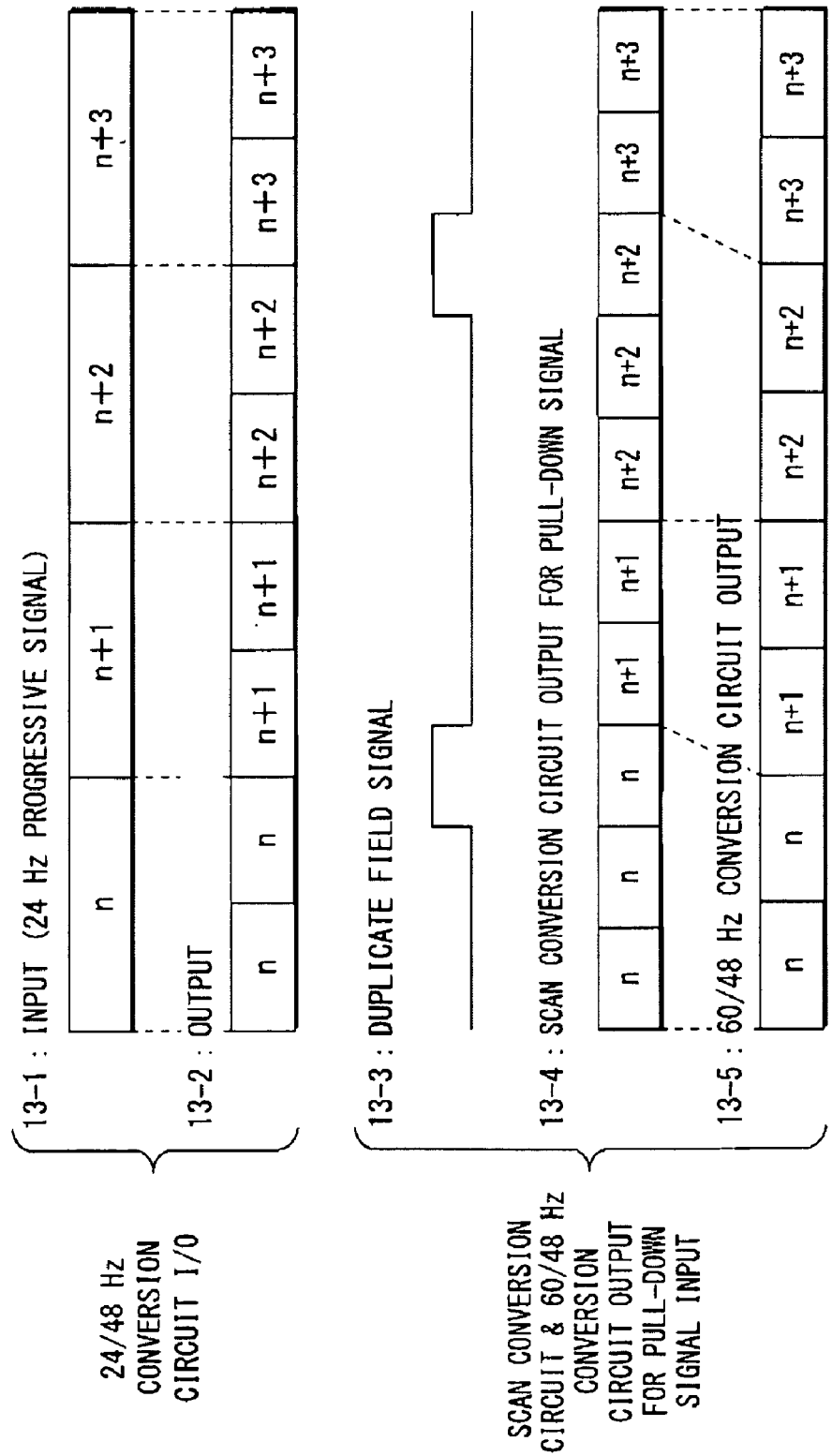
FIG. 13 shows the input/output to/from a 24/48 Hz conversion circuit 21 and a 60/48 Hz conversion circuit 22.

The 24/48 Hz conversion circuit 21 converts 24 Hz progressive video signals output from the video demodulation circuit 6 into 48 Hz progressive video signals for output. Levels 13-1 and 13-2 in FIG. 13 show the input/output to/from the 24/48 Hz conversion circuit 21. The level 13-1 shows an input signal (24 Hz progressive video signal) to the 24/48 Hz conversion circuit 21, while the level 13-2 shows an output signal from the 24/48 Hz conversion circuit 21. As evident from FIG. 13, frames n, n, n+1, n+1, n+2, n+2, n+3, and n+3 are generated from frames n, n+1, n+2, and n+3 constituting the progressive video signal shown at the level 13-1.

<60/48 Hz Conversion Circuit 22>

The 60/48 Hz conversion circuit 22 converts 60 Hz progressive video signals output from the scan conversion circuit 8 into 48 Hz progressive video signals for output. Levels 13-3 to 13-5 in FIG. 13 show the input/output to/from the 60/48 Hz conversion circuit 22 expressed in the same notation as the levels 5-3 to 5-5 in FIG. 5. As evident from FIG. 13, two frames (n and n) are output from three fields (n, n, and n) of a pull-down video signal, and two frames (n+1 and n+1) are output from two fields (n+1 and n+1) subsequent to the three fields (n, n, and n) of the pull-down video signal.

<Improvement of Switch Control Circuit 19 in Second Embodiment>

If a video signal read from the optical disc 1 is a progressive video signal or a pull-down video signal, the 24/48 Hz conversion circuit 21 and the 60/48 Hz conversion circuit 22 output a 48 fps video signal. When the film mode is set in the playback device, the switch control circuit 19 switches the switch 10 to output the 48 fps video signal to the connected monitor, as shown in FIG. 14.

Figure 14:
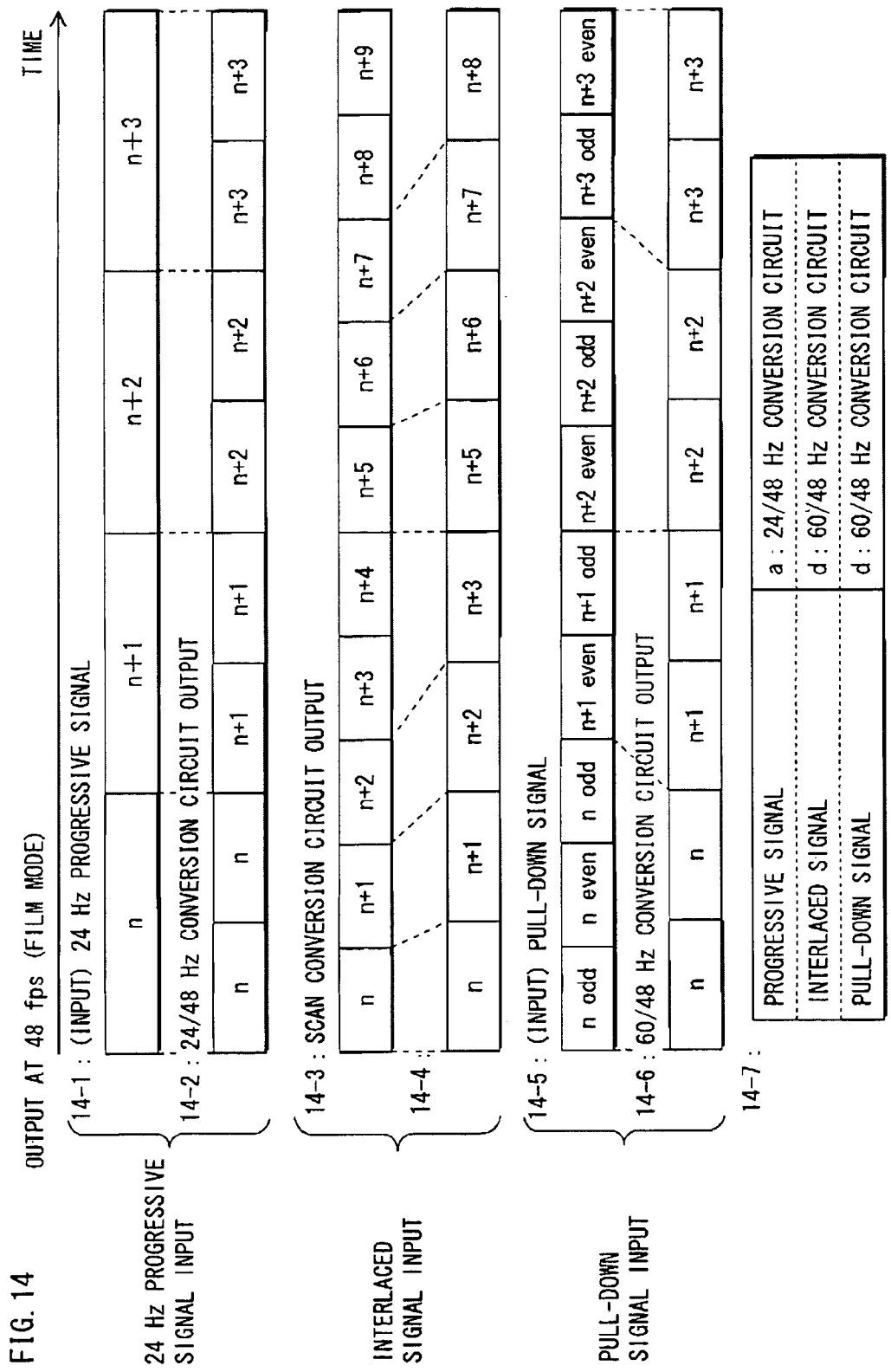
FIG. 14 shows the input/output to/from the 24/48 Hz conversion circuit 21, the scan conversion circuit 8, and the 60/48 Hz conversion circuit 22 in association with switching controls by the switch control circuit 19, in the case where the playback device is connected with the hybrid monitor 400 and the film mode has been set in the playback device.

FIG. 14 shows the input/output to/from the 24/48 Hz conversion circuit 21 and the 60/48 Hz conversion circuit 22 in association with switching controls by the switch control circuit 19, in the case where the playback device is connected with a multiscan monitor and the film mode has been set in the playback device. In FIG. 14, levels 14-1 and 14-2 show the input/output to/from the 24/48 Hz conversion circuit 21 in the case where a 24 Hz progressive video signal is input. Levels 14-3 and 14-4 show the input/output to/from the 60/48 Hz conversion circuit 22 in the case where an interlaced video signal is input. Levels 14-5 and 14-6 show the input/output to/from the 60/48 Hz conversion circuit 22 in the case where a pull-down video signal is input.

A level 14-7 shows switching controls by the switch control circuit 19 in the case where the film mode has been set and the input/output to/from the 24/48 Hz conversion circuit 21 and the 60/48 Hz conversion circuit 22 is as shown at the levels 14-1 to 14-6. The following describes the operations of the switch control circuit 19 in the case where the film mode has been set.

If the video signal read from the optical disc 1 is a progressive video signal, the switch control circuit 19 sets the switch 10 to the contact point a, and outputs the output from the 24/48 Hz conversion circuit 21 to the output setup GUI addition unit 11.

If the video signal read from the optical disc 1 is a pull-down video signal as shown at the level 14-5 in FIG. 14, the switch control circuit 19 sets the switch 10 to the contact point d, and outputs the output from the 60/48 Hz conversion circuit 22 as shown at the level 14-6 in FIG. 14 to the output setup GUI addition unit 11. As a result, a 48 Hz video signal is output to the monitor.

If the video signal read from the optical disc 1 is an interlaced video signal, the switch control circuit 19 sets the switch 10 to the contact point d, and outputs the output from the 60/48 Hz conversion circuit 22 to the output setup GUI addition unit 11. As a result, a 48 Hz video signal is output to the monitor.

That is, in the case where the playback device is connected with a multiscan monitor and the film mode has been set in the playback device, 48 Hz video signals are always output to the output setup GUI addition unit 11.

Also, according to the second embodiment, in the case where the playback device is connected with a multiscan monitor and the output frame rate set in the playback device is 60 fps (video mode), or in the case where the playback device is connected with the 60 Hz monitor 500, 60 Hz video signals are always output to the output setup GUI addition unit 11 as a result of the operations that are the same as described in the first embodiment.

As described above, according to the second embodiment, it is possible to indulge the user with playback quality comparable to that of a movie theater by controlling the connected display device to display at 48 fps. Also, even if playback of interlaced material at 48 fps (film mode) results in video with unnatural movement due to thinning of frames, the user can easily change the output frame rate back to 60 fps (video mode).

Furthermore, the output frame rate has been set to 60 fps (video mode) as the default settings. Accordingly, unless the user expressly permits output at 48 fps (film mode), the user cannot select output at 48 fps (film mode) during playback. Furthermore, when the user permits output at 48 fps (film mode), the precaution statement is displayed on the screen via the GUI. This exhibits an advantage that a user with low knowledge on output at 48 fps (film mode) make less mistakes.

(Third Embodiment)

The third embodiment assumes that a monitor connected with the playback device is multiscan, similarly to the second embodiment. A multiscan monitor is a monitor that performs display at a scan rate specified by the playback device. In the third embodiment, the multiscan monitor is made to perform video playback by scanning at 72 Hz that is an integer multiple of 24 Hz.

Figure 15:
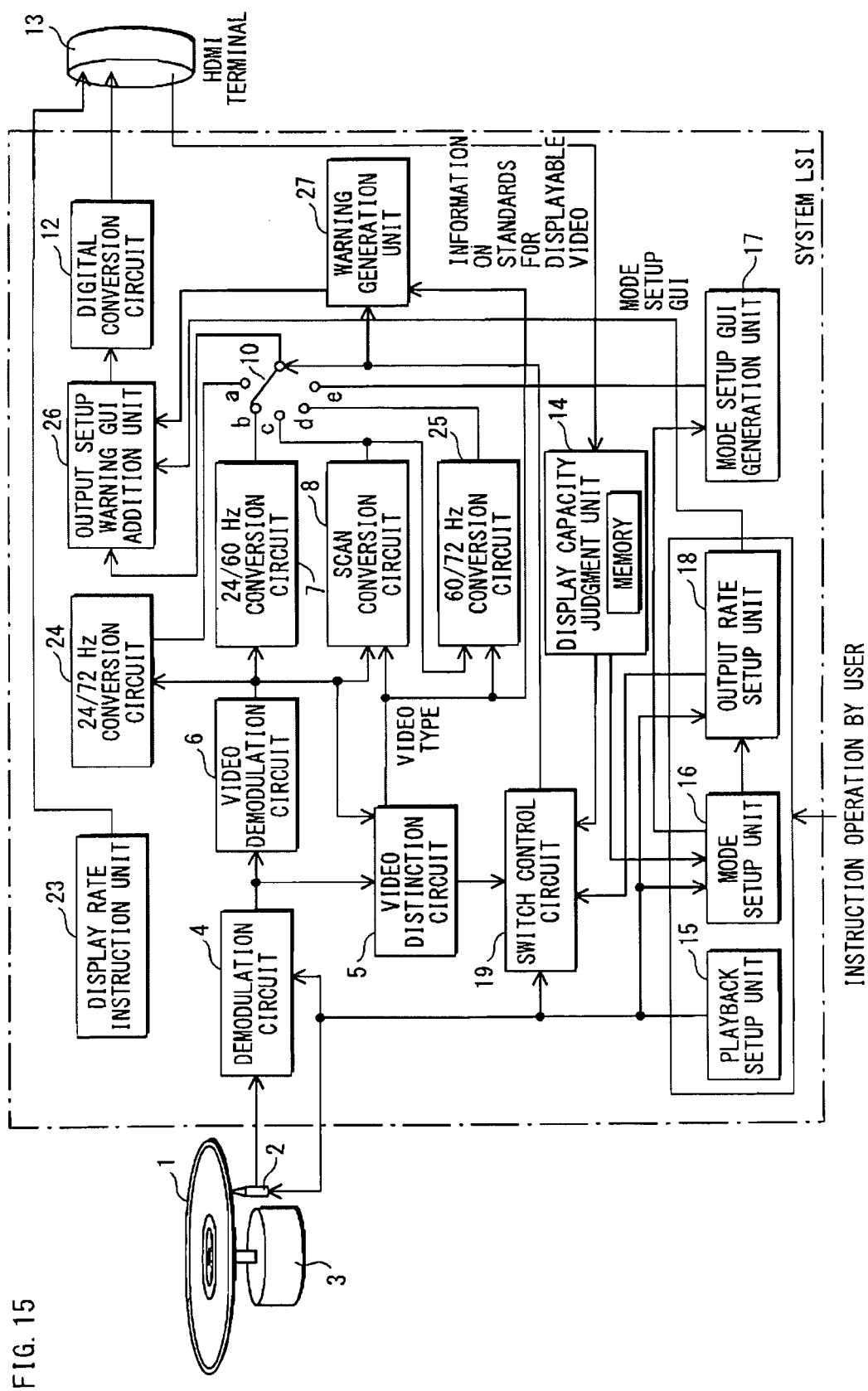
FIG. 15 shows the internal structure of a playback device according to a third embodiment of the present invention.

The internal structure of a playback device according to the third embodiment is described below. FIG. 15 shows the internal structure of the playback device according to the third embodiment. FIG. 15 is based on the internal structure of the playback device according to the second embodiment shown in FIG. 12. A difference from FIG. 12 lies in the fact that, in the playback device according to the third embodiment, a warning generation unit 27 has been added, and the display rate instruction unit 20, the 24/48 Hz conversion circuit 21, the 60/48 Hz conversion circuit 22, and the output setup GUI addition unit 11 have been respectively replaced with a display rate instruction unit 23, a 24/72 Hz conversion circuit 24, a 60/72 Hz conversion circuit 25, and an output setup warning GUI addition unit 26. Because of these improvements and additional constituent elements, the switch control circuit 19 performs the following processing particular to the third embodiment. With such a structure, a 72 fps video signal is output in the film mode instead of a 48 fps signal. These improvements and additional constituent element are described below.

<Display Rate Instruction Unit 23>

If the display capacity judgment unit 14 judges that a monitor connected with the playback device is a multiscan monitor, the display rate instruction unit 23 notifies the monitor connected with the playback device via HDMI of a scan rate to be used for output, which is set by the output rate setup unit 18. This scan rate is 72 fps or 60 fps. When the output rate setup unit 18 changes the settings of the scan rate, the display rate instruction unit 23 instructs the monitor to perform display at the changed scan rate, and causes the 24/72 Hz conversion circuit 24 and the 60/72 Hz conversion circuit 25 to output signals at 72 fps (film mode).

<24/72 Hz Conversion Circuit 24>

The 24/72 Hz conversion circuit 24 converts 24 Hz progressive video signals output from the video demodulation circuit 6 into 72 Hz progressive video signals for output.

Figure 16:
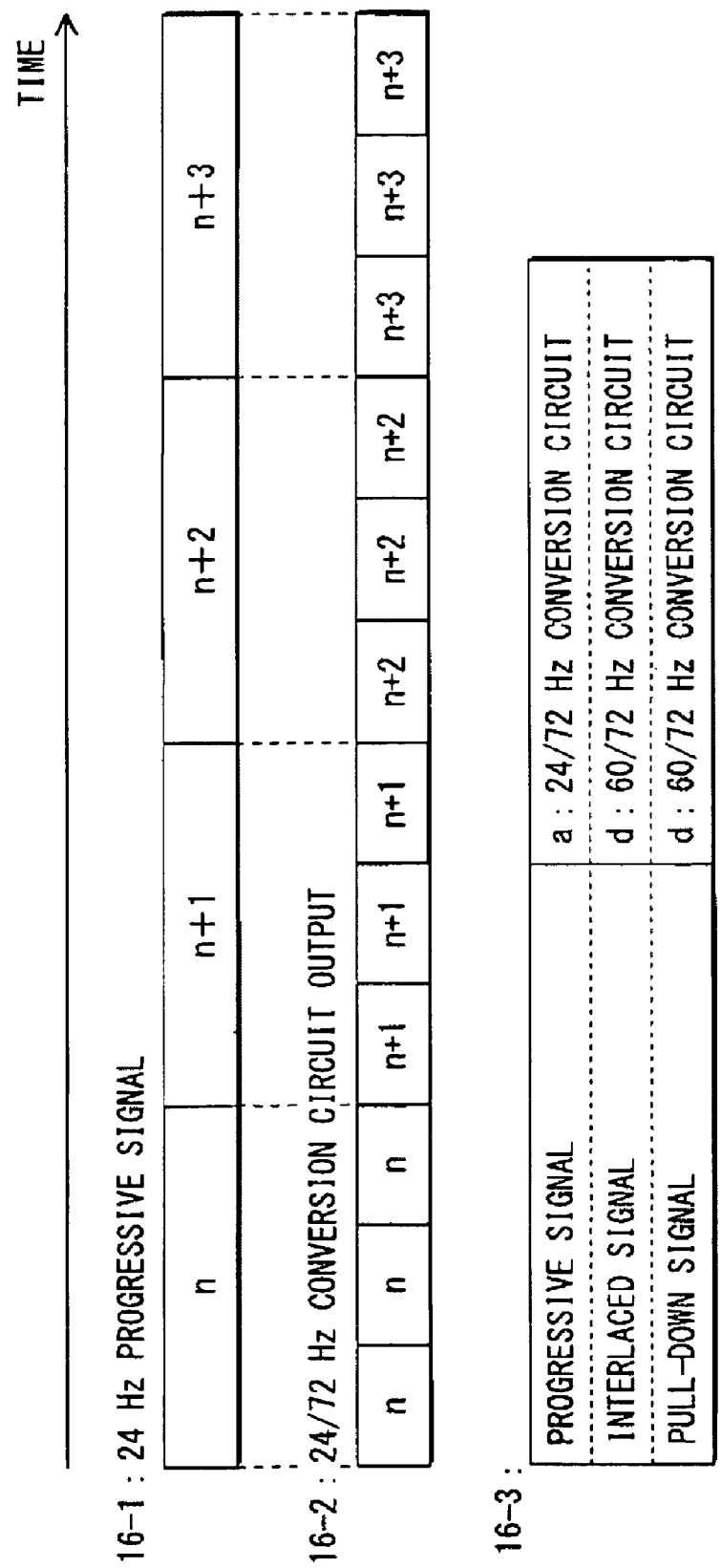
FIG. 16 shows the input/output to/from a 24/72 Hz conversion circuit 24.

FIG. 16 shows the input/output to/from the 24/72 Hz conversion circuit 24. In FIG. 16, a level 16-1 shows the input signal (progressive video signal) to the 24/72 Hz conversion circuit 24, while a level 16-2 shows the output signal from the 24/72 Hz conversion circuit 24. As evident from FIG. 16, frames n, n, n, n+1, n+1, n+1, n+2, n+2, n+2, n+3, n+3, and n+3 are generated from frames n, n+1, n+2, and n+3 constituting the progressive video signal shown at the level 16-1.

<60/72 Hz Conversion Circuit 25>

The 60/72 Hz conversion circuit 25 converts 60 Hz progressive video signals output from the scan conversion circuit 8 into 72 Hz progressive video signals for output.

This completes the description of the 24/72 Hz conversion circuit 24 and the 60/72 Hz conversion circuit 25. The switch control circuit 19 performs the following switching as a result of the 24/48 Hz conversion circuit 21 and the 60/48 Hz conversion circuit 22 having been respectively replaced with the 24/72 Hz conversion circuit 24 and the 60/72 Hz conversion circuit 25.

<Switch Control Circuit 19>

In the third embodiment, when the film mode has been set, the switch control circuit 19 controls the switching of the switch 10 as shown at a level 16-3 in FIG. 16. The level 16-3 shows switching controls by the switch control circuit 19 according to the third embodiment in the case where film mode has been set.

When the film mode has been set in the playback device and the input signal is a progressive video signal, the switch control circuit 19 sets the switch 10 to the contact point a, and outputs the output from the 24/72 Hz conversion circuit 24 to the output setup warning GUI addition unit 26. As a result, a 72 Hz video signal is output to the monitor.

Also, when the film mode has been set in the playback device and the input signal is a pull-down video signal or an interlaced video signal, the switch control circuit 19 sets the switch 10 to the contact point d, and outputs the output from the 60/72 Hz conversion circuit 25 to the output setup warning GUI addition unit 26.

That is, in the third embodiment, in the case where the playback device is connected with a multiscan monitor and the film mode has been set in the playback device, 72 Hz video signals are always output to the output setup warning GUI addition unit 26.

Also, according to the third embodiment, in the case where the playback device is connected with a multiscan monitor and the output frame rate set in the playback device is 60 fps (video mode), or in the case where the playback device is connected with the 60 Hz monitor 500, 60 Hz video signals are always output to the output setup warning GUI addition unit 26 as a result of the operations that are the same as described in the first embodiment.

<Output Setup Warning GUI Addition Unit 26 and Warning Generation Unit 27>

Figure 17:
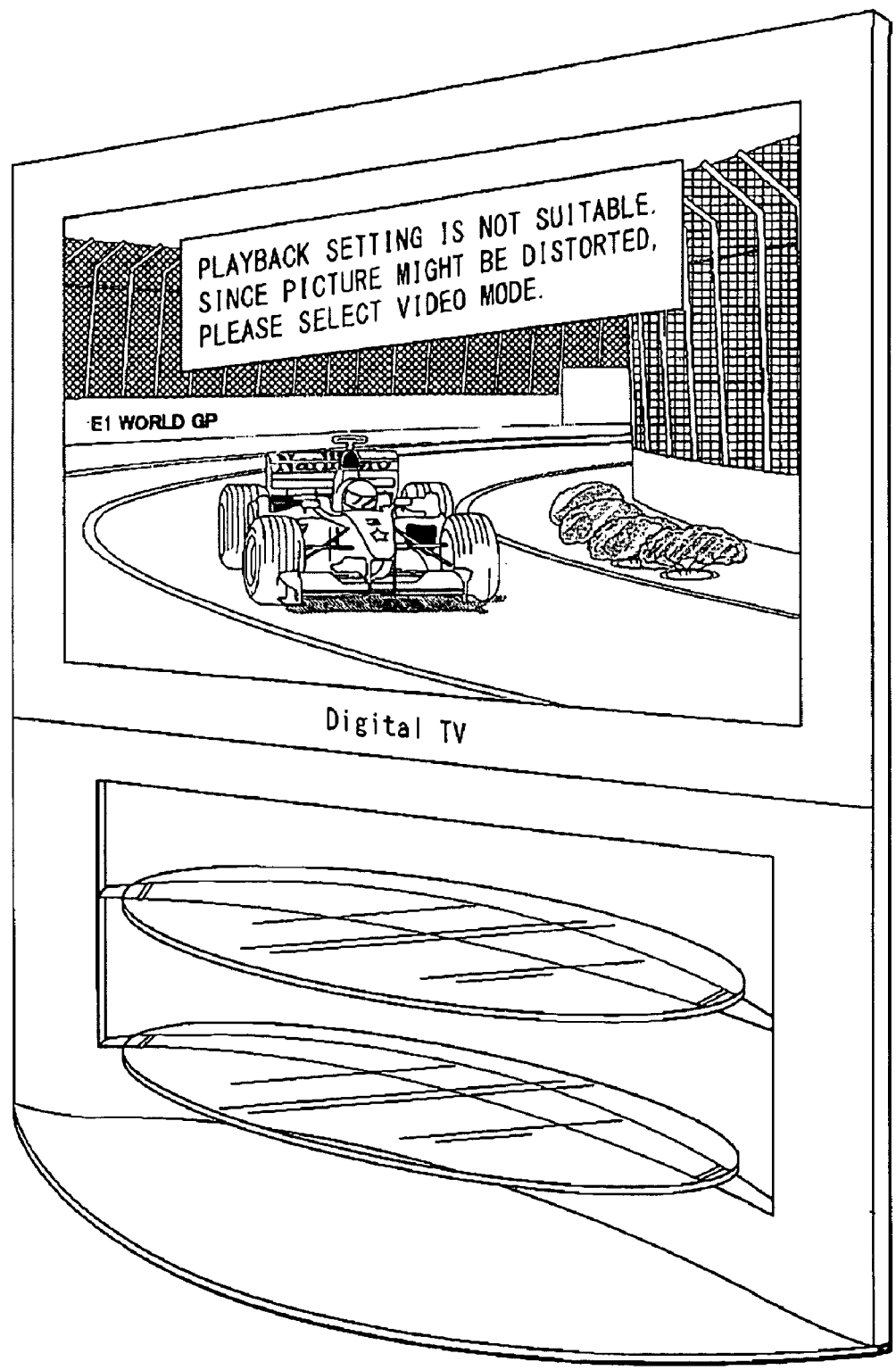
FIG. 17 shows a GUI generated by a warning generation unit 27.

FIG. 17 shows a GUI generated by the warning generation unit 27.

In the third embodiment, in the case where the output frame rate has been set to 72 fps (film mode) and video is interlaced material, the warning generation unit 27 generates a warning image shown in FIG. 17 using an OSD graphics, and outputs the generated warning image to the output setup warning GUI addition unit 26. Upon receiving OSD graphics data of the generated warning image from the warning generation unit 27, the output setup warning GUI addition unit 26 adds the received OSD graphics data to a video signal output from the switch 10, and outputs the video signal to which the OSD graphics data has been added to the digital conversion circuit 12.

Accordingly, the user can recognize that thinning of frames might result in video with unnatural movement.

As described above, according to the third embodiment, it is possible to control the display device connected with the playback device to display video at 72 fps. Also, even if playback of interlaced material at 72 fps (film mode) results in video with unnatural movement, the display device displays a warning image for prompting the user to change the settings of the output frame rate back to the video mode. This enables the user to smoothly change the output frame rate back to 60 fps (video mode) in accordance with the displayed warning image.

Also, the output frame rate has been set to 60 fps (video mode) as the default settings. Accordingly, unless the user expressly permits output at 72 fps (film mode), the user cannot select output at 72 fps (film mode) during playback. Furthermore, when the user permits output at 72 fps (film mode), the precaution statement is displayed on the GUI of the screen. This exhibits an advantage that a user with low knowledge of output at 72 fps (film mode) makes less mistakes.

(Fourth Embodiment)

Figure 18:
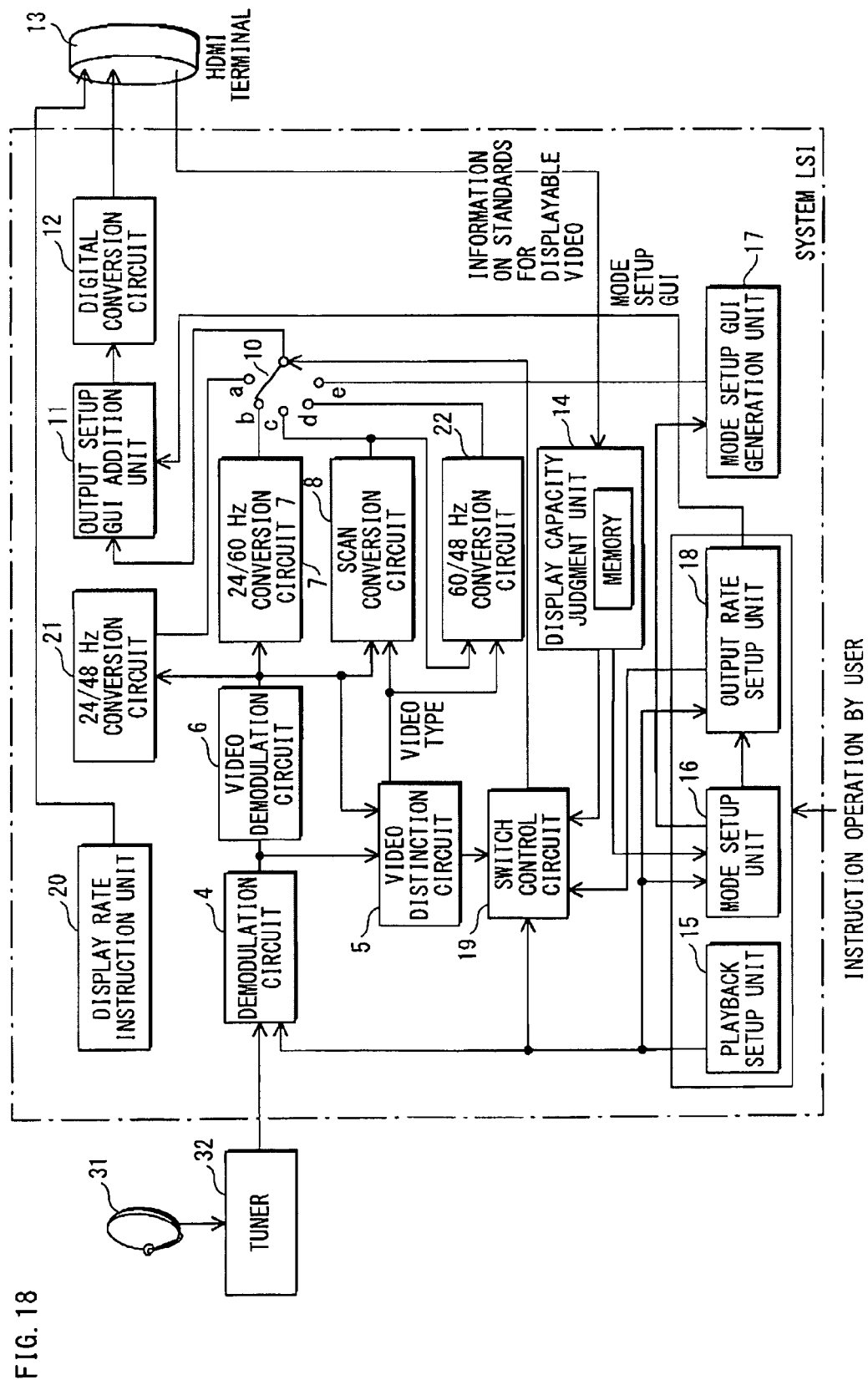
FIG. 18 shows the internal structure of a playback device in the case where a video signal is input from a transmission medium.

The first to the third embodiment describe the optical disc 1 as being the input source of the video signal. A fourth embodiment concerns an improvement in the case where the input source of the video signal is a broadcast wave. FIG. 18 shows the internal structure of a playback device in the case where the input source of the video signal is a transmission medium such a broadcast wave. A comparison of the internal structure shown in FIG. 18 with that in FIG. 12 reveals that the optical pickup 2 and the motor 3 have been replaced with an antenna 31 and a tuner 32. The inclusion of the antenna 31 and the tuner 32 constitutes the improvement of the fourth embodiment.

The antenna 31 receives broadcast waves multiplexed with video signals compressed using MPEG-2 (ITU-T Rec. H.262/ISO/IEC 13818-2) and flags showing whether the video signals are progressively scanned or interlaced scanned.

The tuner 32 selects a broadcast wave received from the antenna 31, and outputs the selected broadcast wave to the demodulation circuit 4. The demodulation circuit 4 performs demodulation using this output.

According to the fourth embodiment as described above, even in the case where video signals transmitted as broadcast waves include a plurality of types of video signals each having a different frame rate, such as a progressive video signal, an interlaced video signal, and a pull-down video signal, it is possible to exhibit the effect the same as that in the first embodiment because the playback device according to the fourth embodiment can perform processing the same as that in the first embodiment.

(Fifth Embodiment)

Figure 19:
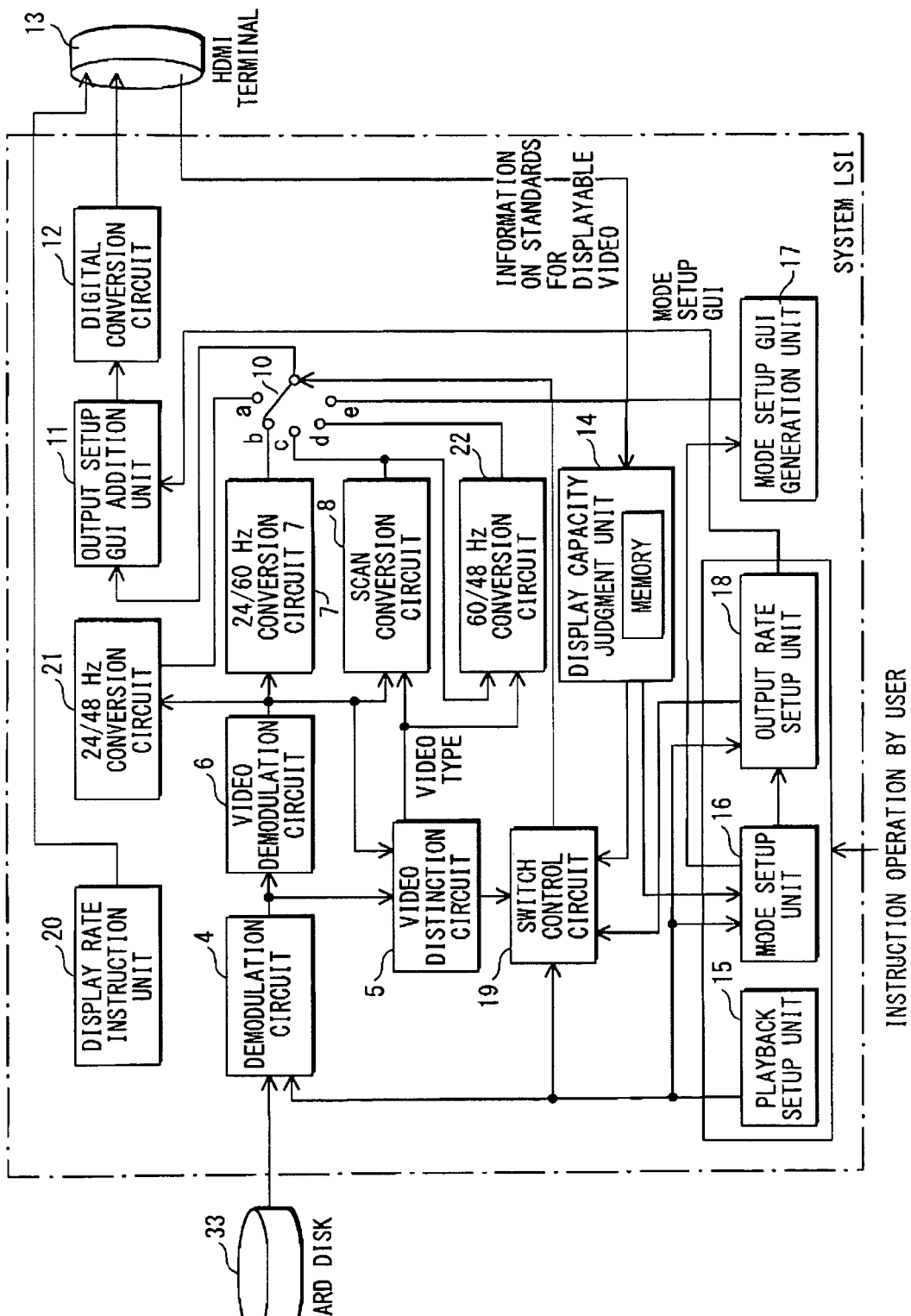
FIG. 19 shows the internal structure of a playback device in the case where a video signal is input from a hard disk.

The first to the third embodiments describe the optical disc 1 as being the input source of the video signal. A fifth embodiment concerns an improvement in the case where the input source of the video signal is a hard disk. FIG. 19 shows the internal structure of a playback device in the case where the input source of the video signal is a hard disk. A comparison of the internal structure shown in FIG. 19 with that in FIG. 12 reveals that the optical disc 1, the optical pickup 2, and the motor 3 have been replaced with a hard disk 33. The inclusion of the hard disk 33 constitutes the improvement of the fifth embodiment.

The hard disk 33 is a built-in disk having video streams compressed using MPEG-2 (ITU-T Rec. H.262/ISO/IEC 13818-2) recorded thereon. Video signals input to the playback device via the antenna 31 and the tuner 32 are recorded on the hard disk 33 in a digitized state. Flags showing whether the compressed video signals are progressively scanned or interlaced scanned are also recorded on the hard disk 33.

According to the fifth embodiment as described above, even in the case where video signals transmitted as broadcast waves and stored in a hard disk include a plurality of types of video signals each having a different frame rate, such as a progressive video signal, an interlaced video signal, and a pull-down video signal, it is possible to exhibit the effect the same as that in the first embodiment because the playback device according to the fifth embodiment can perform processing the same as that in the first embodiment.

(Notes)

Although the best mode known to the applicant at the time the application was filed has been described above, further improvements and modifications can be added in relation to the technical topics shown below. Whether or not to perform these improvements and modifications is arbitrary, and it should be noted that these improvements and modifications arise from the intentions of the executor of the invention.

(Realization of Control Procedures)

The control procedures described in the preferred embodiments with reference to the flow charts, and the control procedures performed by the functional constituent elements involve the creation of a technical idea utilizing natural laws, and satisfy the establishment requirements for a "program invention", given that they are specifically realized using hardware resources.

(Production Configuration of Computer Program)

Computer programs relating to the present invention can be made as follows. A programmer firstly writes source programs that realize the flow charts and the functional constituent elements, using a programming language. The source programs that the programmer writes embody the flow charts and functional constituent elements, using class structures, variables, array variables, and external function calls, in accordance with the structure of the programming language.

The created source programs are provided to a compiler as files. The compiler translates these source programs to create object programs.

The translation by the compiler is composed of syntax analysis, optimization, resource allocation, and code generation processes. Syntax analysis involves lexical analysis, syntax analysis, and semantic analysis being performed on the source programs, and the source programs being converted to intermediary programs. Optimization involves performing basic block analysis, control flow analysis, and data flow analysis on the intermediary programs. Resource allocation involves allocating variables in the intermediary programs to registers or memories in the target processor, in order to achieve conformity with the instruction set of the target processor. Code generation involves converting intermediary instructions in the intermediary programs to program code to obtain object programs.

Here, the generated object programs are constituted from one or more program codes for causing a computer to execute the steps of the flow charts shown in the preferred embodiments and the individual procedures of the functional constituent elements. Here, there are various types of program codes, such as JAVA™ byte code and the native code of a particular processor. There are various ways of realizing the steps using program code. If the steps are realized using an external function, the program code is a call for calling the external function. Furthermore, program code for realizing one step may also belong to different object programs. With an RISC processor having restrictions on instruction type, the steps in the flow charts may also be realized by incorporating arithmetic instructions, logic instructions, and branch instructions etc.

Once the object programs have been generated, the programmer runs a linker on these programs. The linker allots the object programs and related library programs to memory space, and combines them into one to generate a load module. The generated load module is premised on reading by a computer, and causes the computer to execute the processing procedures shown in the flow charts and the processing procedures of the functional constituent elements. Computer programs relating to the present invention can be created through the above processing.

(Usage Configurations of Computer Programs Relating to the Present Invention)

Computer programs relating to the present invention can be used as follows.

(i) Use as Incorporated Programs

If the computer programs relating to the present invention are used as incorporated programs, a load module equating to these programs is written into an instruction ROM together with basic I/O programs (BIOS) and various middleware (operating system). Through incorporating this instruction ROM in a control unit and causing a CPU to execute the programs in the instruction ROM, programs relating to the present invention can be used as control programs.

(ii) Use as Applications

If the playback device has a built-in hard disk, the basic I/O programs (BIOS) are incorporated into the instruction ROM and the middleware (operating system) is preinstalled in the hard disk. Furthermore, a boot ROM for bootstrapping the operating system from the hard disk is provided in the playback device.

In this case, only the load module is supplied to the playback device via a network or a portable recording medium, and installed in the hard disk as a single application. Then, having bootstrapped the operating system using the boot ROM, the playback device causes the CPU to execute the application as a single application, and thereby uses the programs relating to the present invention.

(Realization of Constituent Elements from Demodulation Circuit 4 to Switch Control Circuit 19)

The constituent elements from the demodulation circuit 4 to the switch control circuit 19 described in the embodiments can be individually realized as a single system LSI. Alternatively, the constituent elements from the demodulation circuit 4 to the switch control circuit 19 can be collectively realized as a single system LSI.

A system LSI is a packaged large-scale integrated chip constituted by mounting bare chips on a high-density substrate. By mounting a plurality of bare chips on a high-density substrate, a package in which a plurality of bare chips are provided with the outward appearance of a single LSI is also included as a system LSI (this type of system LSI is referred to as a multichip module).

Focusing now on the types of packages, system LSIs include Quad Flat Packages (QFP) and Pin Grid Arrays (PGA). A QFP is a system LSI in which pins are attached to the four-sides of the package. A PGA is a system LSI in which the majority of pins are attached to the bottom of the package.

These pins are charged with the task of being interfaces to other circuits. Given that the pins in a system LSI have this role as interfaces, the system LSI acts as the core of the playback device if other circuits are connected to these pins in the system LSI.

Bare chips packaged in a system LSI are each composed of a front-end unit, a back-end unit, and a digital processing unit. The front-end unit digitizes analog signals, and the back-end unit converts data resulting from the digital processing to analog and outputs the converted data.

The constituent elements shown in the internal structure diagrams of the preferred embodiments are mounted in the digital processing unit.

As mentioned in the above section (i) Use as Incorporated Programs, a load module equating to these programs is written into an instruction ROM together with basic I/O programs (BIOS) and various middleware (operating system). In the embodiments, it is the load module equating to the programs of the present invention that is created in particular, thereby enabling a system LSI relating to the present invention to be produced by packaging the instruction ROM storing this load module as bare chips.

System-on-Chip (SoC) technology or System-in-Package (SiP) technology preferably is used in the mounting. The SoC technology involves fusing a plurality of circuits to a single chip. The SiP technology involves using resin or the like to form a plurality of chips into a single package. It is possible, through this processing, to create a system LSI relating to the present invention, based on the internal structure diagrams of the playback device shown in the preferred embodiments.

Note that an integrated circuit generated as described above may also be referred to as an IC, an LSI, a super LSI, or an ultra LSI, depending on the degree of integration. Furthermore, all or some of the constituent elements of the playback device may be constituted as a single chip. The integration is also not limited to the SoC and SiP technology, and may be realized by a dedicated circuit or by a general-purpose process. After manufacturing of the LSI, the use a Field Programmable Gate Array (FPGA) or a silicon flexible processor in which the connection and settings of circuit cells in the LSI can be restructured is considered possible. Furthermore, if integration technology is developed that replaces LSIs due to progressive or derivative semiconductor technology, integration of functional blocks using this technology is naturally possible. For example, the adaptation of biotechnology is a possibility.

(Types of Recording Media)

In the first embodiment, the optical disc 1 as a recording medium is given as an example of a read-only optical disc, although the configuration of the recording medium and the recording method is not limited to this. Furthermore, the optical pickup 2, the motor 3, and the like are necessary elements in a structure that is premised on the provision of the optical disc 1. However, if the type and configuration of the recording medium adopts another structure such as a semiconductor memory card, a unit operable to drive the recording medium and a unit operable to record/play signals in relation to the recording medium may be decided as necessary in terms of what is suitable for the recording medium.

(Input of Interlaced Video Signals)

Although not specifically described above, the hybrid monitor 400 and the 60 Hz monitor 500 according to the first embodiment have the capacity to display interlaced video signals. When the input signal is an interlaced video signal, the scan conversion circuit 8 of the playback device may through-output the interlaced video signal, rather than converting the signal to a 60 Hz progressive video signal.

(Frame Rate)

In the first to the fifth embodiments, the descriptions are provided regarding the case where the output frame rates of video signals are 60 fps and an integer multiple of 24 fps. Alternatively, the present invention is applicable to the case where other value is used as the output frame rate. For example, in the case of use of an integer multiple of 60/1.001 fps and an integer multiple of and 24/1.001 fps, which are generally used for the broadcasting system in which audio signals are transmitted simultaneously with video signals, it is possible to exhibit the effects of the present invention as well.

(Video Demodulation Circuit 6, 24/60 Hz Conversion Circuit 7, Scan Conversion Circuit 8, 60/24 Hz Conversion Circuit 9, 24/48 Hz Conversion Circuit 21, 60/48 Hz Conversion Circuit 22, 24/72 Hz Conversion Circuit 24, and 60/72 Hz Conversion Circuit 25)

In the descriptions of these constituent elements in the embodiments, only the conversion of frame rate is described, and the resolution is not described. By including a function of converting the resolution in theses constituent elements, it is also possible to exhibit the effects of the present invention.

For example, by including, in these constituent elements, a function of converting Standard-Definition (SD) resolution (720 horizontal×480 vertical pixels) images to High-Definition (HD) resolution (1920 horizontal×1080 vertical pixels) images, it is possible to display SD resolution video signals of media such as DVDs on a HD resolution monitor.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

Industrial Applicability

It is clear that the playback device relating to the present invention will be mass-produced based on the internal structure thereof disclosed in the above embodiments. Accordingly, the playback device relating to the present invention has the quality for industrial use, and therefore has the industrial applicability.

What is claimed is:

1. A playback device that performs video output to a display device by converting an output frame rate of source video signals in accordance with an operation mode of the playback device, the source video signals having a first period in which a frame rate is a first frame rate and a second period in which the frame rate is a second frame rate, the playback device comprising:
   a mode setup unit operable to, in accordance with a user selection, set the operation mode to one of a fixed mode in which the output frame rate is fixed to the first frame rate and a switchable mode in which the output frame rate is switchable between the first frame rate and the second frame rate;
   a switch unit operable to switch a video output mode between (a) a first output mode in which the source video signals are output in the first period without converting the output frame rate, and are output in the second period by converting the output frame rate to the first frame rate and (b) a second output mode in which the source video signals are output in the second period without converting the output frame rate, and are output in the first period by converting the output frame rate to the second frame rate; and
   a switch reception unit operable to, while the source video signals are output to the display device in the switchable mode, receive a user instruction to switch the output frame rate from one of the first frame rate and the second frame rate to the other, wherein
   if the switch reception unit receives the instruction to switch the output frame rate to the second frame rate, the switch unit switches the video output mode to the second output mode, and
   if the switch reception unit receives the instruction to switch the output frame rate to the first frame rate, the switch unit switches the video output mode to the first output mode.

2. The playback device of claim 1, further comprising a GUI generation unit operable to generate a mode GUI and display the generated mode GUI on the display device, the mode GUI being for prompting the user to select the operation mode while informing the user of a possibility of display on the display device being disrupted due to output of the source video signals in the switchable mode, wherein
   the mode setup unit receives the user selection of one of the fixed mode and the switchable mode via the mode GUI.

3. The playback device of claim 2, wherein
   when the operation mode is set to the switchable mode, the GUI generation unit further generates a reception GUI in accordance with a user request made while the source video signals are output to the display device, the reception GUI being for receiving the user instruction on whether to set the output frame rate to the first frame rate or the second frame rate, and
   the switch reception unit receives the instruction to switch the output frame rate via the reception GUI.

4. The playback device of claim 3, wherein
   the reception GUI has a first state and a second state that are switched there between in response to a user operation, and is set to have the first state as a default state,
   the reception GUI in the first state receives a user instruction to switch the output frame rate to the first frame rate, and
   the reception GUI in the second state receives a user instruction to switch the output frame rate to the second frame rate.

5. The playback device of claim 2, wherein
when the operation mode is set to the switchable mode, while the source video signals are output in the first period by converting the output frame rate to the second frame rate, the GUI generation unit further generates a warning GUI and displays the generated warning GUI on the display device, the warning GUI for informing the user of a possibility of display on the display device being disrupted.

6. The playback device of claim 1, further comprising:
a video distinction circuit operable to judge whether the source video signals includes duplicate fields in the first period;
a scan conversion circuit operable to, if the duplicate fields are included, classify fields from a field immediately subsequent to one duplicate field to a next duplicate field into fields constituting two frames; and
a frame rate conversion circuit operable to convert the output frame rate from the first frame rate to the second frame rate, by converting the fields classified by the scan conversion circuit as constituting the two frames into two frames of a video signal having the second frame rate.

7. The playback device of claim 1, further comprising
a judgment unit operable to judge whether the display device is capable of displaying the source video signals at only the first frame rate or both the first frame rate and the second frame rate, wherein
if the judgment unit judges the display device is capable of displaying the source video signals at both the first and second frame rates, the mode setup unit sets the operation mode.

8. The playback device of claim 7, being connected with the display device via a predetermined interface, wherein
the judgment unit extracts video standards information from the display device via the predetermined interface, and makes the judgment based on the extracted video standards information.

9. The playback device of claim 1, further comprising:
a first reading unit relating to a first type recording medium from which video information is read to obtain the source video signals having both the first frame rate and the second frame rate; and
a second reading unit relating to a second type recording medium from which video information is read to obtain one of a video signal having the first frame rate and a video signal having the second frame rate, wherein
when the first reading unit reads the video information from the first type recording medium, the mode setup unit sets the operation mode, and the switch reception unit receives the instruction to switch the output frame rate.

10. A playback device that outputs video to a display device by converting an output frame rate of source video signals in accordance with a display capability of the display device, the source video signals having a first frame rate in a first period and a second frame rate in a second period, the playback device comprising:
a mode setup unit operable to, in accordance with a user selection, set an operation mode of the playback device to one of a fixed mode in which an output frame rate of the source video signals are fixed to the first frame rate and a switchable mode in which the output frame rate is switchable between the first frame rate and a third frame rate that is an integer multiple of the second frame rate;
a switch unit operable to switch a video output mode between (a) a first output mode in which the source video signals are output in the first period without converting the output frame rate, and are output in the second period by converting the output frame rate to the first frame rate and (b) a second output mode in which the display device is instructed to perform display the source video signals at the third frame rate, and the source video signals are output in the first period and the second period by converting the output frame rate to the third frame rate; and
a switch reception unit operable to, while the source video signals are output to the display device in the switchable mode, receive a user instruction to switch the output frame rate from one of the first frame rate and the third frame rate to the other, wherein
if the switch reception unit receives the instruction to switch the output frame rate to the third frame rate, the switch unit switches the video output mode to the second output mode, and
if the switch reception unit receives the instruction to switch the output frame rate to the first frame rate, the switch unit switches the video output mode to the first output mode.

11. The playback device of claim 10, wherein
the third frame rate is an integer multiple of 24 Hz, and
the playback device further comprises
a frame rate conversion circuit operable to output the source video signals having the first frame rate and the second frame rate by converting the output frame rate to a frame rate that is an integer multiple of 24 Hz.

12. A playback method for use in a playback device for use in a playback device that performs video output to a display device by converting an output frame rate of source video signals in accordance with an operation mode of the playback device, the source video signals having a first period in which a frame rate is a first frame rate and a second period in which the frame rate is a second frame rate,
the playback device comprising:
a switch unit operable to switch a video output mode between (a) a first output mode in which the source video signals are output in the first period without converting the output frame rate, and are output in the second period by converting the output frame rate to the first frame rate and (b) a second output mode in which the source video signals are output in the second period without converting the output frame rate, and are output in the first period by converting the output frame rate to the second frame rate; and
the playback method comprising:
a mode setup step for, in accordance with a user selection, setting the operation mode to one of a fixed mode in which the output frame rate is fixed to the first frame rate and a switchable mode in which the output frame rate is switchable between the first frame rate and the second frame rate;
a switch reception step for, while the source video signals are output to the display device in the switchable mode, receiving a user instruction to switch the output frame rate from one of the first frame rate and the second frame rate to the other; and
a switch step for, if the switch reception step receives the instruction to switch the output frame rate to the second frame rate, switching the video output mode to the second output mode, and if the switch reception step receives the instruction to switch the output frame rate to the first frame rate, switching the video output mode to the first output mode.

* * * * *